United States Patent
Fisher et al.

(10) Patent No.: US 10,655,347 B2
(45) Date of Patent: *May 19, 2020

(54) CONCRETE FORMING SYSTEM

(71) Applicant: General Steel and Supply Company, Dickinson, ND (US)

(72) Inventors: Thomas G. Fisher, Dickinson, ND (US); Gregory L. Schafer, Dickinson, ND (US)

(73) Assignee: TGR Construction, Inc., Tempe, AZ (US)

( * ) Notice: Subject to any disclaimer, the term of this patent is extended or adjusted under 35 U.S.C. 154(b) by 228 days.

This patent is subject to a terminal disclaimer.

(21) Appl. No.: 15/997,597

(22) Filed: Jun. 4, 2018

(65) Prior Publication Data

US 2019/0100930 A1 Apr. 4, 2019

Related U.S. Application Data

(63) Continuation of application No. 15/722,417, filed on Oct. 2, 2017, now Pat. No. 9,988,823.

(51) Int. Cl.
*E04G 19/00* (2006.01)
*E04G 11/20* (2006.01)
(Continued)

(52) U.S. Cl.
CPC ............ *E04G 19/003* (2013.01); *E04G 11/20* (2013.01); *B62D 55/00* (2013.01); *B62D 63/04* (2013.01); *E04G 11/08* (2013.01)

(58) Field of Classification Search
CPC ....... E04G 19/00; E04G 19/003; E04G 11/08; E04G 11/20
(Continued)

(56) References Cited

U.S. PATENT DOCUMENTS 1,721,816 A 7/1929 Glazer
2,497,887 A * 2/1950 Hilpert ...................... E04B 1/04
52/125.4
(Continued)

FOREIGN PATENT DOCUMENTS

DE 2657111 A1 * 6/1977 ........... E04G 19/003
DE 102012206353 A1 * 10/2013 ........... E04G 19/003
(Continued)

OTHER PUBLICATIONS http://www.aluminumconcreteforms.com/crane_set_concrete_forms.htm; Wall-Ties & Forms Concrete Big Panel Concrete Forms Website Page; Received Oct. 18, 2017.
(Continued)

*Primary Examiner* — Michael Safavi
(74) *Attorney, Agent, or Firm* — Neustel Law Offices

(57) ABSTRACT

A concrete forming system for reducing the time and labor required for the framing, pouring, and curing of concrete walls. The concrete forming system generally includes concrete forms including a first wall, a second wall opposing the first wall, and a pair of sidewalls. A cavity is formed between the walls; with an opening being fluidly connected to the cavity. A first vehicle is connected to the first wall and a second vehicle is connected to the second wall. Using the vehicles, the positioning and orientation of the walls may be adjusted. After the walls have been placed and oriented, the vehicles will hold the walls in place as concrete is poured into the cavity through the opening. The concrete is allowed to cure into a structure; after which the vehicles and walls may be moved to another location to repeat the process.

26 Claims, 36 Drawing Sheets

(51) Int. Cl.
  *B62D 63/04* (2006.01)
  *B62D 55/00* (2006.01)
  *E04G 11/08* (2006.01)

(58) Field of Classification Search
  USPC .......................................................... 264/33
  See application file for complete search history.

(56) References Cited

U.S. PATENT DOCUMENTS

| | | | |
|---|---|---|---|
| 2,717,801 A | | 9/1955 | Neil |
| 3,635,613 A * | | 1/1972 | Marsh .................... B28B 7/0044 249/160 |
| 3,687,597 A * | | 8/1972 | Lavergne, Jr. ........ B28B 7/0038 249/144 |
| 3,926,318 A | | 12/1975 | Kister |
| 3,954,189 A | | 5/1976 | Sherritt |
| 4,003,543 A * | | 1/1977 | Doubleday ............. E04G 13/02 249/193 |
| 4,023,771 A * | | 5/1977 | Walchek .................. B28B 17/00 249/139 |
| 4,098,045 A * | | 7/1978 | Astor ...................... E04G 11/10 249/210 |
| 4,290,246 A * | | 9/1981 | Hilsey .................... E02D 27/02 52/125.3 |
| 4,314,775 A * | | 2/1982 | Johnson .................. F16L 1/036 138/105 |
| 4,405,262 A * | | 9/1983 | Nagashima ............. E02D 13/10 248/354.2 |
| 4,417,425 A | | 11/1983 | Case |
| 4,441,685 A * | | 4/1984 | Greeson .................. E04G 13/02 249/219.1 |
| 4,481,743 A | | 11/1984 | Jellen |
| 4,611,784 A * | | 9/1986 | Gallis ...................... E04G 5/04 182/82 |
| 4,671,724 A | | 6/1987 | Bolton |
| 4,676,713 A * | | 6/1987 | Voelpel ................. B65G 49/061 414/590 |
| 4,700,979 A | | 10/1987 | Courtois |
| 4,708,315 A * | | 11/1987 | Carlson ................... E04G 11/10 249/191 |
| 4,726,562 A | | 2/1988 | Courtois |
| 4,795,136 A * | | 1/1989 | Haefner ................ B66C 23/208 254/336 |
| 4,807,843 A | | 2/1989 | Courtois |
| 4,812,113 A * | | 3/1989 | Jantzen ................... B28B 13/06 249/86 |
| 4,846,433 A | | 7/1989 | Courtois |
| 4,927,317 A * | | 5/1990 | Acosta .................... B09B 1/004 212/259 |
| 5,050,365 A | | 9/1991 | Edgar |
| 5,073,077 A | | 12/1991 | Altman |
| RE33,881 E | | 4/1992 | Courtois |
| 5,114,294 A | | 5/1992 | Attman |
| 5,127,791 A * | | 7/1992 | Attman ................ B66F 9/0655 414/10 |
| 5,224,808 A * | | 7/1993 | Macris .................... B66F 19/00 414/11 |
| 5,351,456 A | | 10/1994 | Paine, Jr. |
| 5,441,379 A | | 8/1995 | Gilbert, Jr. |
| 5,537,797 A * | | 7/1996 | Harkenrider ............... E04G 9/05 52/745.13 |
| 5,624,222 A | | 4/1997 | Hiatt |
| 5,643,488 A * | | 7/1997 | Lee ........................... B28B 7/22 249/190 |
| 5,799,399 A * | | 9/1998 | Schultz .................... E04G 11/10 249/44 |
| 5,857,296 A | | 1/1999 | Niday |
| 5,922,236 A * | | 7/1999 | Zuhl ....................... E04G 13/00 249/216 |
| 6,513,785 B1 | | 2/2003 | Worley |
| 6,523,323 B2 | | 2/2003 | Worley |
| 6,729,079 B2 | | 5/2004 | Francies, III |
| 6,755,385 B2 | | 6/2004 | Lancelot, III |
| 7,004,443 B2 | | 2/2006 | Bennett |
| 7,051,988 B2 | | 5/2006 | Shaw |
| 7,222,460 B2 | | 5/2007 | Francies, III |
| 7,775,500 B1 * | | 8/2010 | Vegsund ................. E04G 11/12 249/219.2 |
| 7,828,263 B2 | | 11/2010 | Bennett |
| 7,874,053 B2 * | | 1/2011 | Stangel ................ B65D 90/008 220/1.5 |
| 8,186,645 B2 | | 5/2012 | Shaw |
| 8,317,502 B1 * | | 11/2012 | Grey ...................... B28B 11/10 264/333 |
| 8,464,996 B2 | | 6/2013 | Spindler |
| 9,033,619 B2 | | 5/2015 | Riggle, Jr. |
| 9,212,462 B2 | | 12/2015 | Borel |
| 9,297,179 B2 | | 3/2016 | Smith |
| 9,347,231 B2 | | 5/2016 | Cormier |
| 2004/0218997 A1 | | 11/2004 | Neubauer |
| 2005/0220597 A1 | | 10/2005 | Burkett |
| 2006/0062655 A1 | | 3/2006 | Harrelson |
| 2008/0050213 A1 | | 2/2008 | Kundel |
| 2009/0267320 A1 | | 10/2009 | Phillips |
| 2011/0305529 A1 * | | 12/2011 | Riggle, Jr. ............. E02D 17/083 405/283 |
| 2013/0020732 A1 * | | 1/2013 | Jentsch .................... E04G 11/28 264/33 |
| 2013/0248680 A1 * | | 9/2013 | Fergeson ................ E02D 29/12 249/11 |
| 2015/0081178 A1 | | 3/2015 | Billaud |
| 2016/0201408 A1 | | 7/2016 | Little |

FOREIGN PATENT DOCUMENTS

| | | | | |
|---|---|---|---|---|
| EP | 3179010 A1 * | 6/2017 | ............. | E04G 11/06 |
| FR | 2951149 B1 | 4/2011 | | |
| FR | 2951149 B1 * | 11/2011 | ........... | E04G 19/003 |
| FR | 3032953 B1 | 8/2016 | | |
| FR | 3032953 B1 * | 2/2017 | ........... | E04G 19/003 |
| FR | 3045692 A1 * | 6/2017 | ............. | E04G 11/06 |
| SU | 903530 A1 * | 2/1982 | ............. | E04G 19/00 |

OTHER PUBLICATIONS http://www.aluminumconcreteforms.com/concrete_forming_systems.htm; Wall-Ties & Forms Concrete Forming Systems and Formwork Website Page; Received Oct. 18, 2017.
http://www.daytonsuperior.com/search#?sections=products&productlines=forming; Dayton Product Search Website Page; Received Oct. 18, 2017.
Dayton Forming Accessories Handbook; Received Oct. 18, 2017.
Dayton Rapid Clamp System Manual; Received Oct. 18, 2017.
Dayton Steel Ply System Manual; Received Oct. 18, 2017.
Harsco LOGIK Forming System Manual; Received Oct. 18, 2017.
PCT Search Report and Written Opinion for US2018/20499; dated Apr. 27, 2018.

* cited by examiner

CONCRETE FORMING SYSTEM

CROSS REFERENCE TO RELATED APPLICATIONS

The present application is a continuation of U.S. application Ser. No. 15/722,417 filed on Oct. 2, 2017 which issues on Jun. 5, 2018 as U.S. Pat. No. 9,988,823. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a concrete forming system for reducing the time and labor required for the framing, pouring, and curing of concrete walls.

Related Art

Any discussion of the related art throughout the specification should in no way be considered as an admission that such related art is widely known or forms part of common general knowledge in the field.

Walls have been in use since biblical times. Walls in the past have been constructed of blocks, wood, metals, or concrete. When constructing concrete walls, a liquid concrete is generally injected into a form and allowed to cure into a solid concrete wall. The forms may be constructed on-site which requires a significant amount of time and labor for each wall built.

Previous concrete forming systems rely on the setting of numerous free-standing panels to construct a form. The panels must be set and aligned manually and then cross-tied together to remain in place. On larger projects, this can require a significant amount of panels which each must be manually moved and reset in different positions, which is extremely labor and time intensive.

Failure to properly align the panels can significantly impact the constructed wall—sometimes even requiring that such a defective wall be torn down and the process started again. Failure to properly cross-tie the panels together can similarly result in structural deficiencies in the resulting wall. For example, if two free-standing panels are not cross-tied properly, one of the panels may fall down during the pouring process which will require a significant clean-up on the part of the construction crew building the concrete wall.

Current forming systems are available in large panels but require extensive site labor with manpower and lifting equipment. These systems require several days to set, cross tie, and brace prior to pouring. Along with another period of time to disassemble and reset to make the next pour sequence, repeating the process. After completing each pour laborers then need to return to the finished wall and remove the cross ties, and or plug holes left behind from the cross ties.

SUMMARY

An example embodiment is directed to a concrete forming system. The concrete forming system includes concrete forms including a first wall, a second wall opposing the first wall, a first side wall, and a second sidewall. A cavity is formed between the walls; with an opening being fluidly connected to the cavity. An arm coupler on the arm of a first vehicle is connected to a corresponding coupler on the first wall. An arm coupler on the arm of a second vehicle is connected to corresponding coupler on the second wall. Using the vehicles, the positioning and orientation of the walls may be adjusted. After the walls have been placed and oriented, the vehicles will hold the walls in place as concrete is poured into the cavity through the opening. The concrete is allowed to cure into a structure; after which the vehicles and walls may be moved to another location to repeat the process.

There has thus been outlined, rather broadly, some of the embodiments of the concrete forming system in order that the detailed description thereof may be better understood, and in order that the present contribution to the art may be better appreciated. There are additional embodiments of the concrete forming system that will be described hereinafter and that will form the subject matter of the claims appended hereto. In this respect, before explaining at least one embodiment of the concrete forming system in detail, it is to be understood that the concrete forming system is not limited in its application to the details of construction or to the arrangements of the components set forth in the following description or illustrated in the drawings. The concrete forming system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
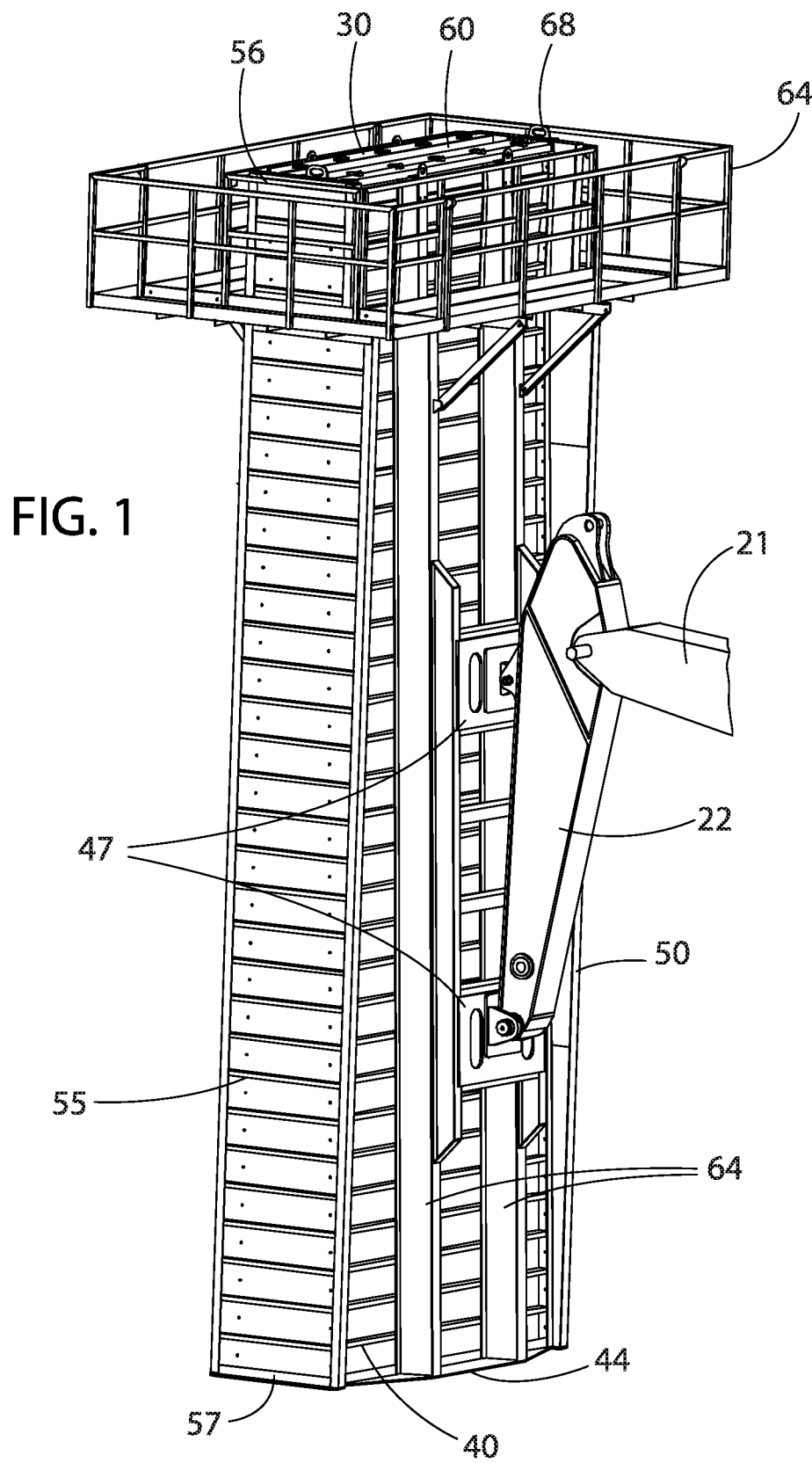
FIG. 1 is a perspective view of a concrete forming system in accordance with an example embodiment.
Figure 2:
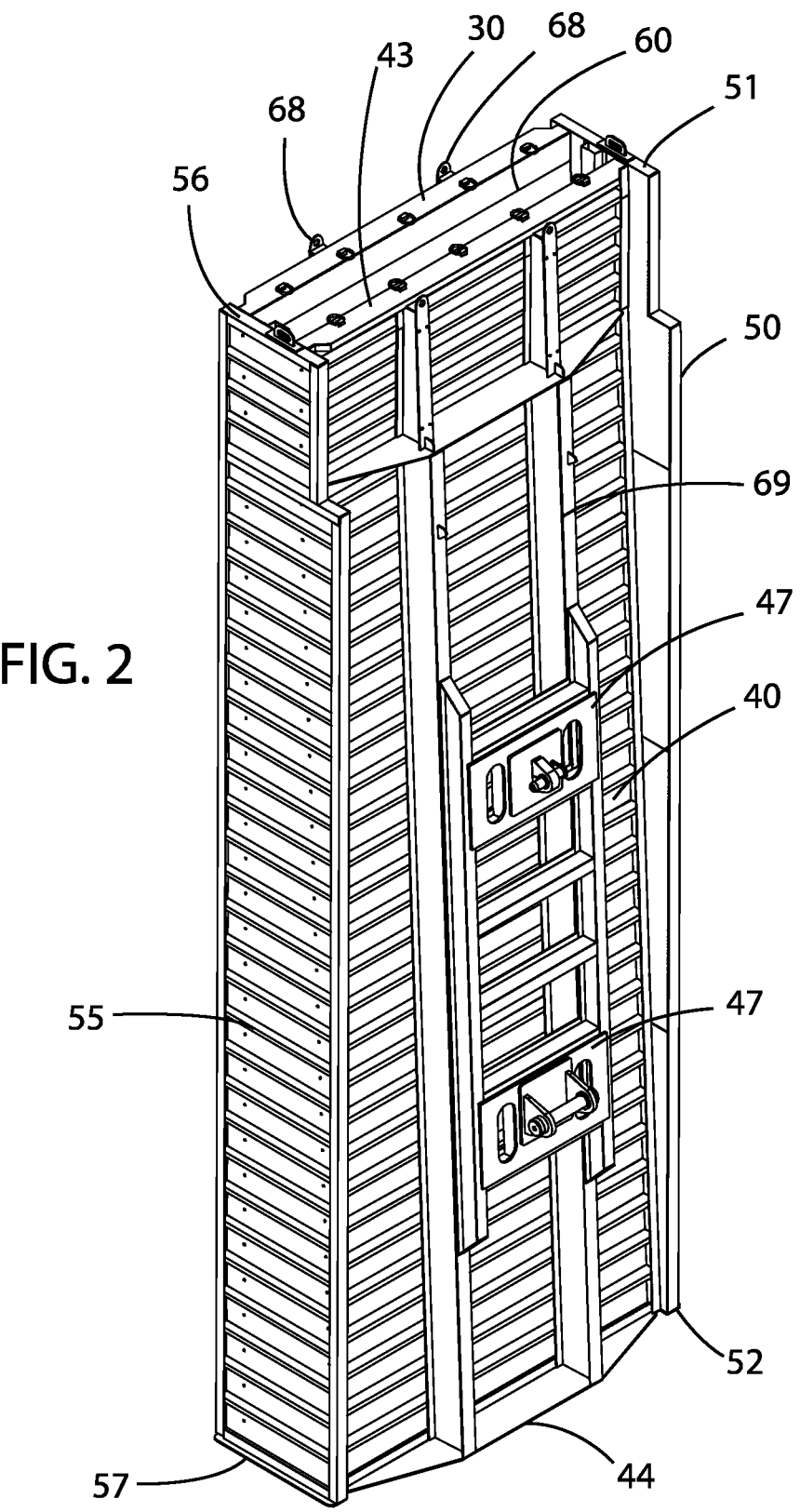
FIG. 2 is a frontal upper perspective view of a concrete forming system in accordance with an example embodiment.
Figure 3:
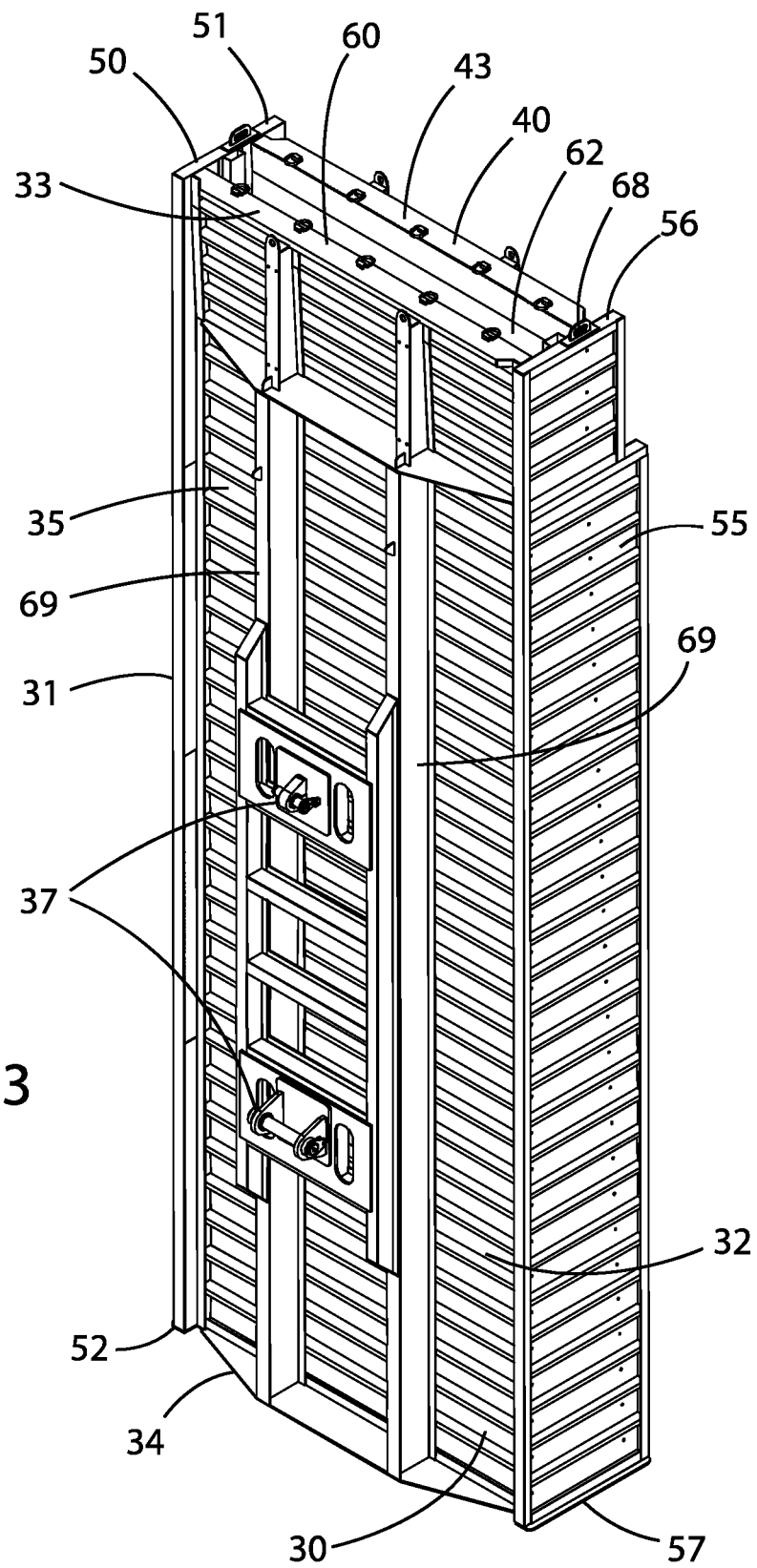
FIG. 3 is a rear upper perspective view of a concrete forming system in accordance with an example embodiment.
Figure 4:
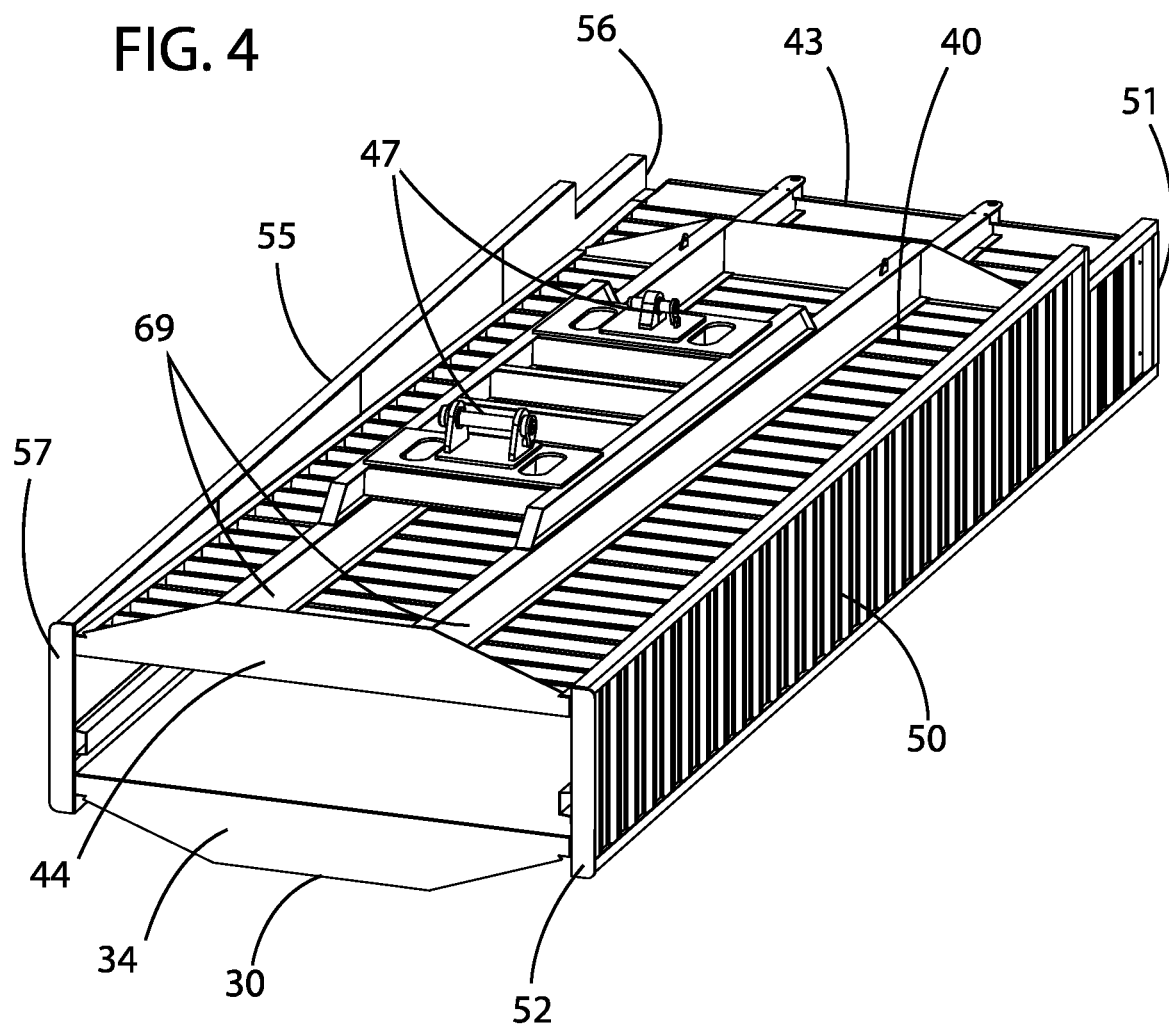
FIG. 4 is a bottom perspective view of a concrete forming system in accordance with an example embodiment.

An example concrete forming system 10 generally comprises a first wall 30 having a first end 31, a second end 32, an upper end 33, and a lower end 34. As shown in FIGS. 1-6, the system 10 may also include a second wall 40 having a first end 41, a second end 42, an upper end 43, and a lower end 44; a first sidewall 50 connected between the first ends 31, 41 of the first wall 30 and the second wall 40; and a second sidewall 55 connected between the second ends 32, 42 of the first wall 30 and the second wall 40. A cavity 62 is defined between the first wall 30, the second wall 40, the first sidewall 50, and the second sidewall 55. The cavity 62 is adapted to receive a volume of concrete 12 and retain the concrete 12 during the curing process. An opening 60 formed within the upper ends 31, 41 of the first wall 30, second wall 40, first sidewall 50, and second sidewall 55 is fluidly connected with the cavity 62; with the opening 60 being adapted to receive the concrete 12. Also included is a first vehicle 20 adapted to traverse a ground surface 17. The first vehicle 20 may include a first arm 21 extending from the first vehicle 20, a first arm coupler 22 connected to a distal portion of the first arm 21, and a plurality of first wheels or tracks 27 connected to a first motor. A first coupler 37 may be connected to the first wall 30; with the first coupler 37 being connected to the first arm coupler 22; with the first arm 21 retaining the first wall 30 in a desired position with respect to the second wall 40.

Figure 11:
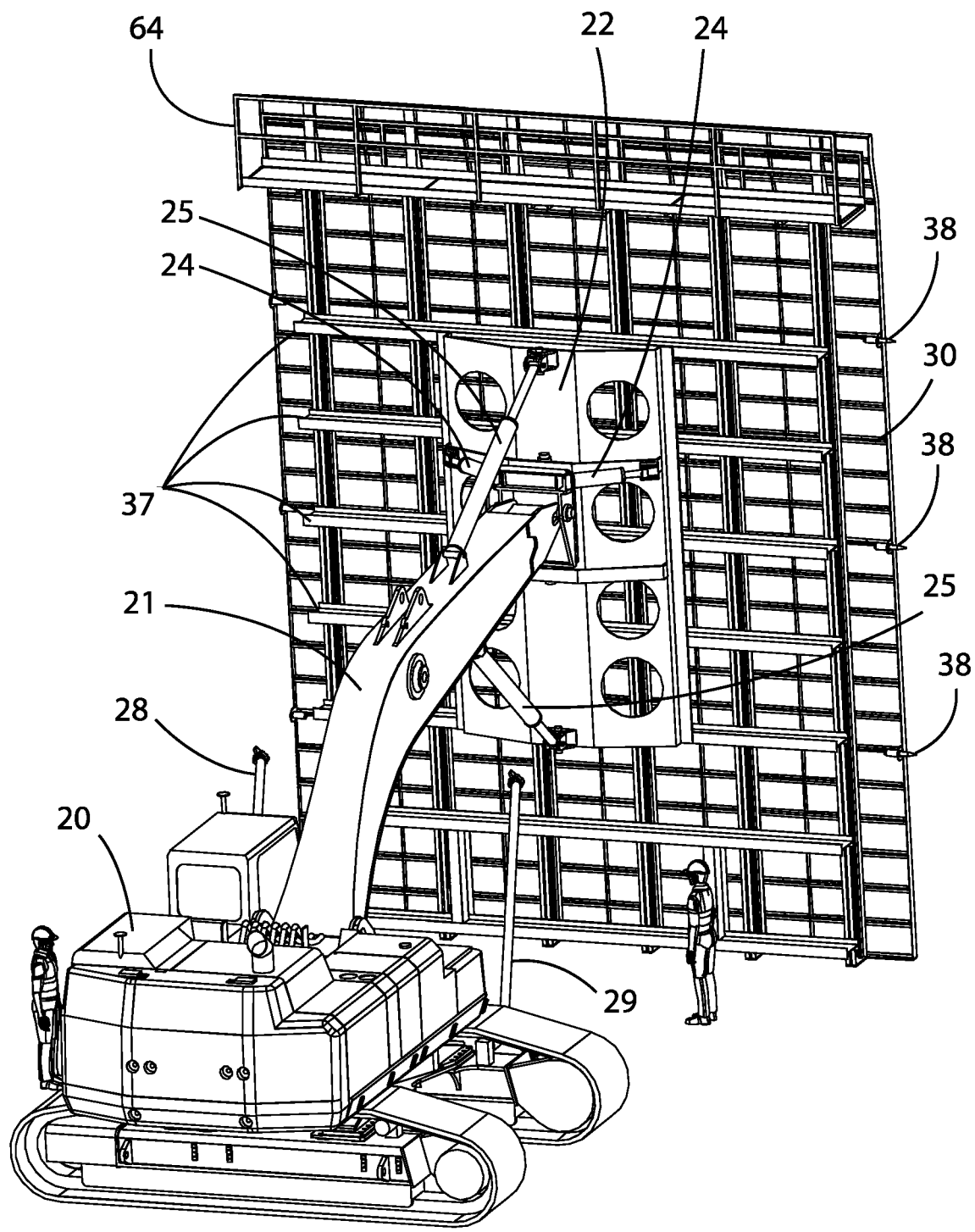
FIG. 11 is an upper perspective view of a vehicle supporting a first wall in accordance with an example embodiment of a concrete forming system.

Any of the wall 30, 40 may be rotated about up to three axes (pitch, roll, and yaw) by a corresponding arm 21 of a vehicle 20 in some embodiments. In an exemplary embodiment such as shown in FIG. 11, a pitch actuator 25 may be connected between the first arm 21 and the first arm coupler 22; with the pitch actuator 25 being adapted to adjust a pitch of the first arm coupler 22 and the first wall 30 with respect to the first arm 21. A yaw actuator 24 may be connected between connected between the first arm 21 and the first arm coupler 22; with the yaw actuator 24 being adapted to adjust a yaw of the first arm coupler 22 and the first wall 30 with respect to the first arm 21. The pitch actuator 25 may be connected near an upper end of the first arm coupler 22 and the yaw actuator 24 may be connected near a side of the first arm coupler 22. A first support 28 may be movably connected to the first vehicle 20 and removably connected to the first wall 30.

In some embodiments, a second vehicle 20 adapted to traverse the ground surface 17 may include a second arm 21 extending from the second vehicle 20, a second arm coupler 22 connected to a distal portion of the second arm 21, and a plurality of second wheels or tracks 27 connected to a second motor. In such embodiments, a second coupler 47 may be connected to the second wall 40. The second coupler 47 is also connected to the second arm coupler 22 of the second vehicle 20; with the second arm 21 retaining the second wall 40 in a desired position with respect to the first wall 30.

In embodiments utilizing a second vehicle 20, a first pitch actuator 25 may be connected between the first arm 21 and the first arm coupler 22 and a second pitch actuator 25 may be connected between the second arm 21 and the second arm coupler 22; with the first pitch actuator 25 being adapted to adjust a pitch of the first arm coupler 22 and the first wall 20 with respect to the first arm 21 and the second pitch actuator 25 being adapted to adjust a pitch of the second arm coupler 22 and the second wall 40 with respect to the second arm 21.

Such embodiments may also include a first yaw actuator 24 connected between the first arm 21 and the first arm coupler 22 and a second yaw actuator 24 connected between the second arm 21 and the second arm coupler 22; with the first yaw actuator 24 being adapted to adjust a yaw of the first arm coupler 22 and the first wall 30 with respect to the first arm 21 and the second yaw actuator 24 being adapted to adjust a pitch of the second arm coupler 22 and the second wall 40 with respect to the second arm 21. Such embodiments may also include a first support 28 movably connected to the first vehicle 20 and a second support 28 movably connected to the second vehicle 20; with the first support 28 removably connected to the first wall 30 and the second support 28 removably connected to the second wall 40.

In another exemplary embodiment of the concrete form system 10, a first set of walls comprising a first wall 30 having a first end 31, a second end 32, an upper end 33, and a lower end 34 and a second wall 40 having a first end 41, a second end 42, an upper end 43, and a lower end 44 may be provided; with the first wall 30 of the first set of walls being positioned in an opposed spaced-apart relationship with respect to the second wall 40 of the first set of walls. In such an embodiment, the first vehicle 20 may control the first wall 30 of the first set of walls and a second vehicle 20 may control the second wall 40 of the first set of walls. The first set of walls may include a first sidewall 50 connected between the first ends 31, 41 of the first wall 30 and the second wall 40 of the first set of walls. Similarly, a second sidewall 55 may be connected between the second ends 32, 42 of the first and second walls 30, 40 of the first set of walls.

In such an embodiment, a second set of walls comprising a first wall 30 having a first end 31, a second end 32, an upper end 33, and a lower end 34 and a second wall 40 having a first end 41, a second end 42, an upper end 43, and a lower end 44 may be provided; with the first wall 30 of the first set of walls being positioned in an opposed spaced-apart relationship with respect to the second wall 40 of the first set of walls. In such an embodiment, a third vehicle 20 may control the first wall 30 of the second set of walls and a fourth vehicle 20 may control the second wall 40 of the second set of walls. The first wall 30 of the first set of walls may be removably connected to the first wall 30 of the second set of walls and the second wall 40 of the first set of walls may be removably connected to the second wall 40 of the second set of walls. In such an embodiment, the cavity 62 may extend between the first wall 30 of the second set of walls and the second wall 40 of the second set of walls. The first wall 30 of the first set of walls may in some embodiments not be connected to the second wall 40 of the first set of walls, as no cross-tying is necessary due to the use of vehicles 20.

Also disclosed is a method of forming a structure 16 which comprises the steps of moving a first wall 30 with a first vehicle 20 from a previous location on a ground surface 17 to a first location on the ground surface 17, wherein the first location is distally spaced with respect to the previous location; positioning the first wall 30 with the first vehicle 20 such that a lower end 34 of the first wall 30 is retained in the first location on the ground surface 17; moving a second wall 40 with a second vehicle 20 from the previous location on a ground surface 17 to a second location on the ground surface 17, wherein the second location is distally spaced with respect to the previous location and the first location; positioning the second wall 40 with the second vehicle 20 such that a lower end 44 of the second wall 40 is retained in the second location on the ground surface, wherein the first wall 30 is parallel and distally spaced with respect to the second wall 40 so as to define a cavity 62 between the first wall 30 and the second wall 40; filling the cavity 62 between the first wall 30 and the second wall 40 with a volume of concrete 12; and forming the structure 16 between the first wall 30 and the second wall 40 by allowing the concrete 12 to cure within the cavity 62 between the first wall 30 and the second wall 40.

B. Vehicles

As shown throughout the figures, vehicles 20 are generally utilized to support, move, adjust, and retain the walls 30, 40 of the concrete forming system 10. While the figures illustrate the vehicles 20 as comprising excavators, it should be appreciated that a wide range of vehicles 20 may be utilized, such as trucks, cars, loaders, and the like.

Figure 8:
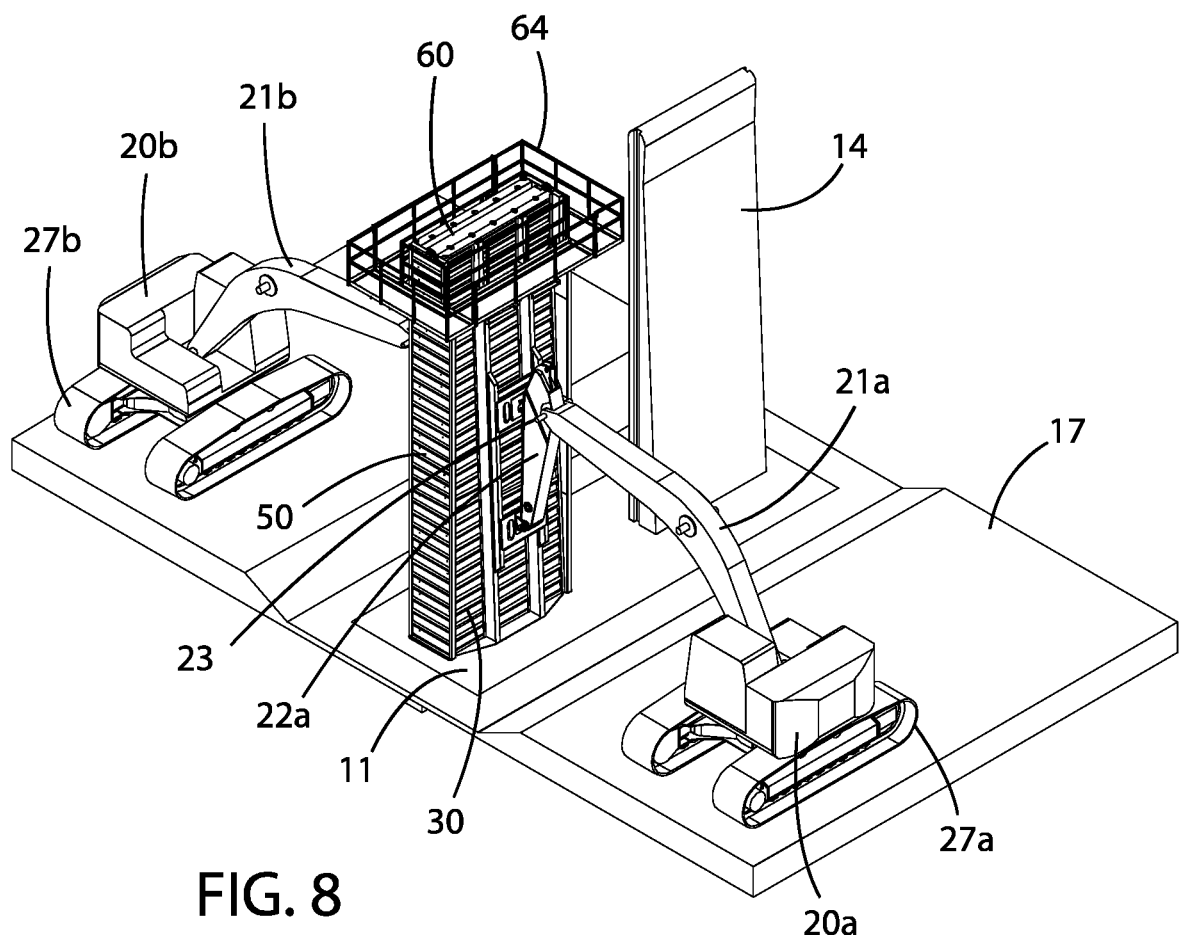
FIG. 8 is an upper perspective view of a concrete forming system in use in accordance with an example embodiment.

As best shown in FIG. 8, each vehicle 20 may include an arm 21 which is movably connected to the vehicle 20. The arm 21 is generally controlled from within the cab of the vehicle 20, though external or remote controls may be utilized in some embodiments. The arm 21 includes an arm coupler 22 at its distal end which is utilized to interconnect the arm 21 with a wall 30, 40. The arm coupler 22 is generally hingedly connected to the arm 21 via a hinge 23 as shown in FIG. 11.

As best shown in FIG. 8, each vehicle 20 may traverse the ground surface 17 using a plurality of tracks 27. Although not shown, it should be appreciated that the vehicle 20 may instead use wheels or any other device known to permit a vehicle 20 to traverse a ground surface 17. In some embodiments, the vehicles 20 may be on rails or the like which run alongside the structure 16 being built.

Figure 12:
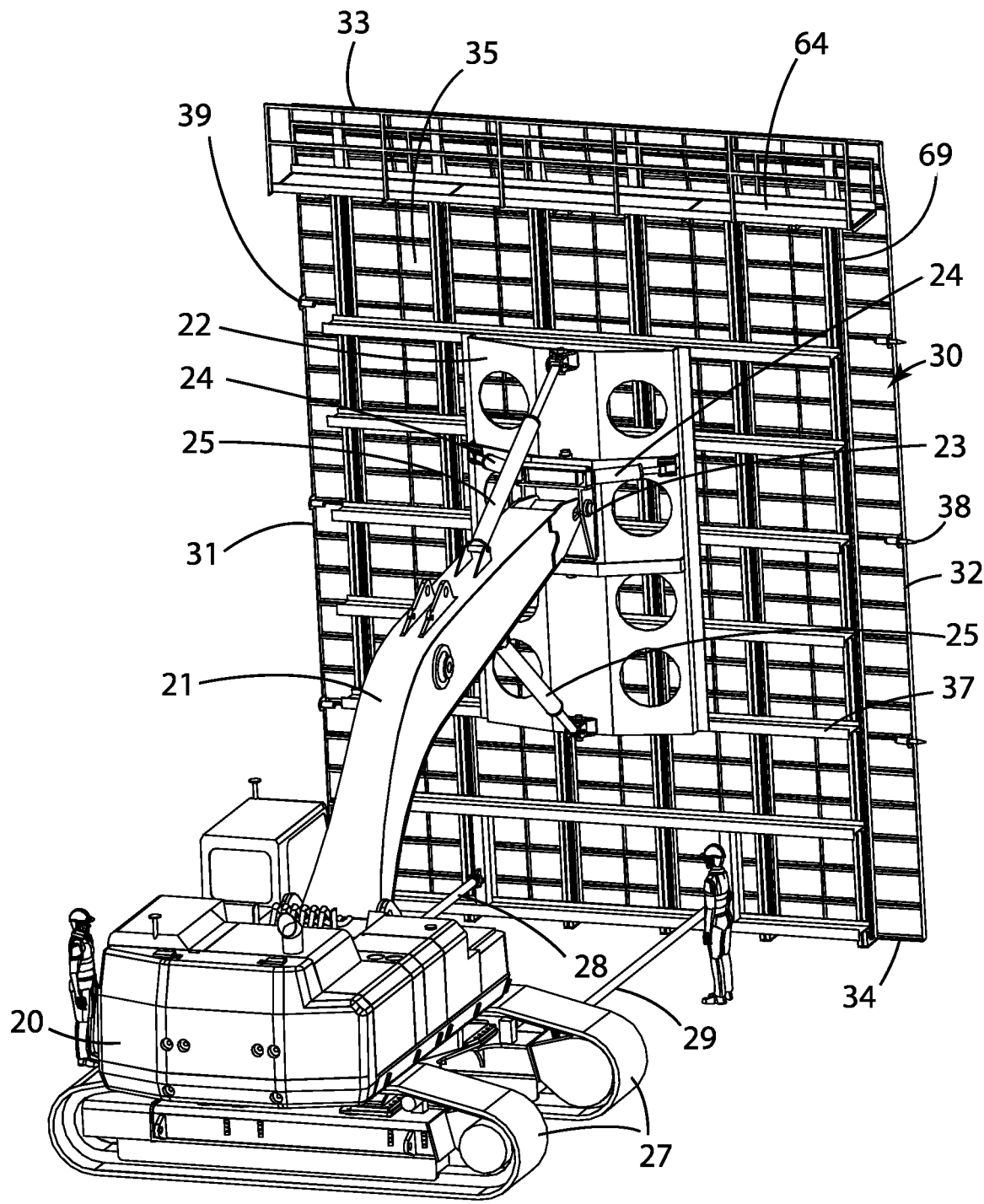
FIG. 12 is an upper perspective view of a vehicle supporting a first wall with supports extended in accordance with an example embodiment of a concrete forming system.

As best shown in FIGS. 11-12, each vehicle 20 may include supports 28, 29 which are movably connected to the vehicle 20. In the embodiment shown in FIG. 15, a vehicle 20 is illustrated with a first support 28 extending from a first side of the vehicle 20 and a second support 29 extending from a second side of the vehicle 20. The supports 28, 29 may be utilized to provide additional stability to the walls 30, 40 when they are being supported by the vehicles 20.

In the embodiment shown in FIGS. 11-12, the supports 28, 29 are removably connected to the outer surface 35 of a first wall 30. The supports 28, 29 are adjustable between a first position in which the supports 28, 29 are not connected to a wall 30, 40 and a second position in which the supports 28, 29 are connected to a wall 30, 40.

The supports 28, 29 may be lowered to come into contact with the wall 30, 40 or raised to release the wall 30, 40. It should be appreciated that the supports 28, 29 may be connected to the wall 30, 40 by frictional engagement or may utilize other locking mechanisms such as brackets, clasps, or the like.

Figure 20:
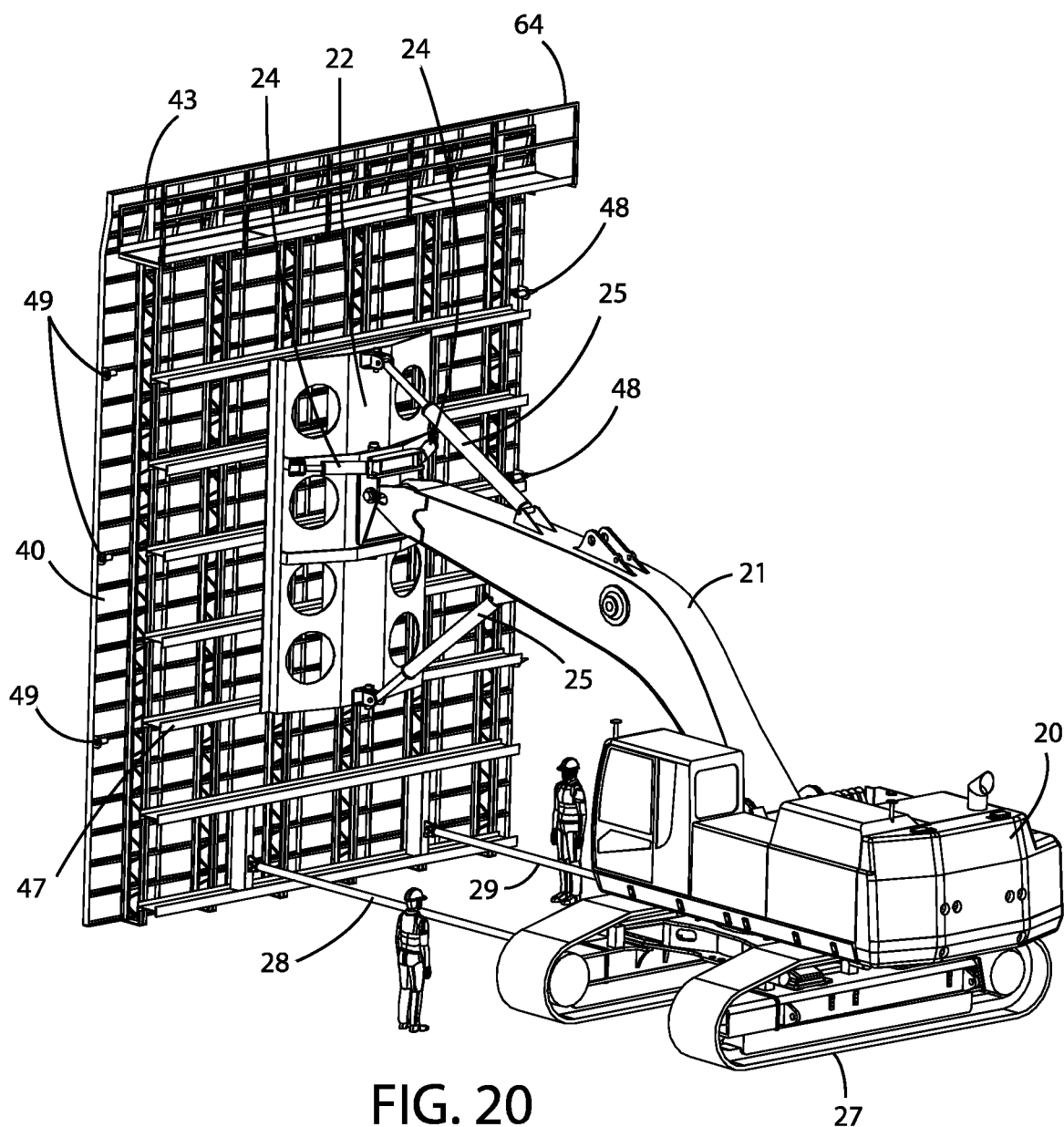
FIG. 20 is an upper perspective view of a second wall being supported by a vehicle in accordance with an example embodiment of a concrete forming system.

As shown in FIG. 20, the first support 28 extends from a first side of the vehicle 20 and the second support 29 extends from a second side of the vehicle 20. The first support 28 may be parallel with respect to the second support 29. The first and second supports 28, 29 may be individually controllable such that the first support 28 may be raised while the second support 29 is lowered, and vice versa.

Generally, the first support 28 will extend from the vehicle 20 to frictionally engage with the lower end 34, 44 of the outer surface 35, 45 of a wall 30, 40 near its first end 31, 41 of the wall 30, 40. The second support 29 may extend from the vehicle 20 to frictionally engage with the lower end 34, 44 of the outer surface 35, 45 of the wall 30, 40 near its second end 32, 42. As shown in FIG. 20, the supports 28, 29 may connect to (such as by frictional engagement) ribs 69 which extend along the outer surface 35, 45 of the wall 30, 40.

The use of vehicles 20 to support the walls 30, 40 allows the omission of cross ties or any interconnection between the first wall 30 and the second wall 40 of a form. The vehicles 20 support allows the walls 30, 40 to withstand the pour pressures of the concrete 12 without cross ties or sidewalls 50, 55 connected between the walls 30, 40. The weight of the vehicle 20 also eliminates the requirement of ground braces to support the walls 30, 40 at the mid or upper points on the walls 30, 40 while pouring.

C. Concrete Forms

As shown throughout the figures, the concrete forming system 10 may include a first wall 30 and a second wall 40 in a spaced-apart, opposed relationship with respect to the first wall 30. Such a configuration creates a concrete form having a cavity 62 in which concrete 12 may be poured and allowed to cure to form a structure 16.

Figure 9:
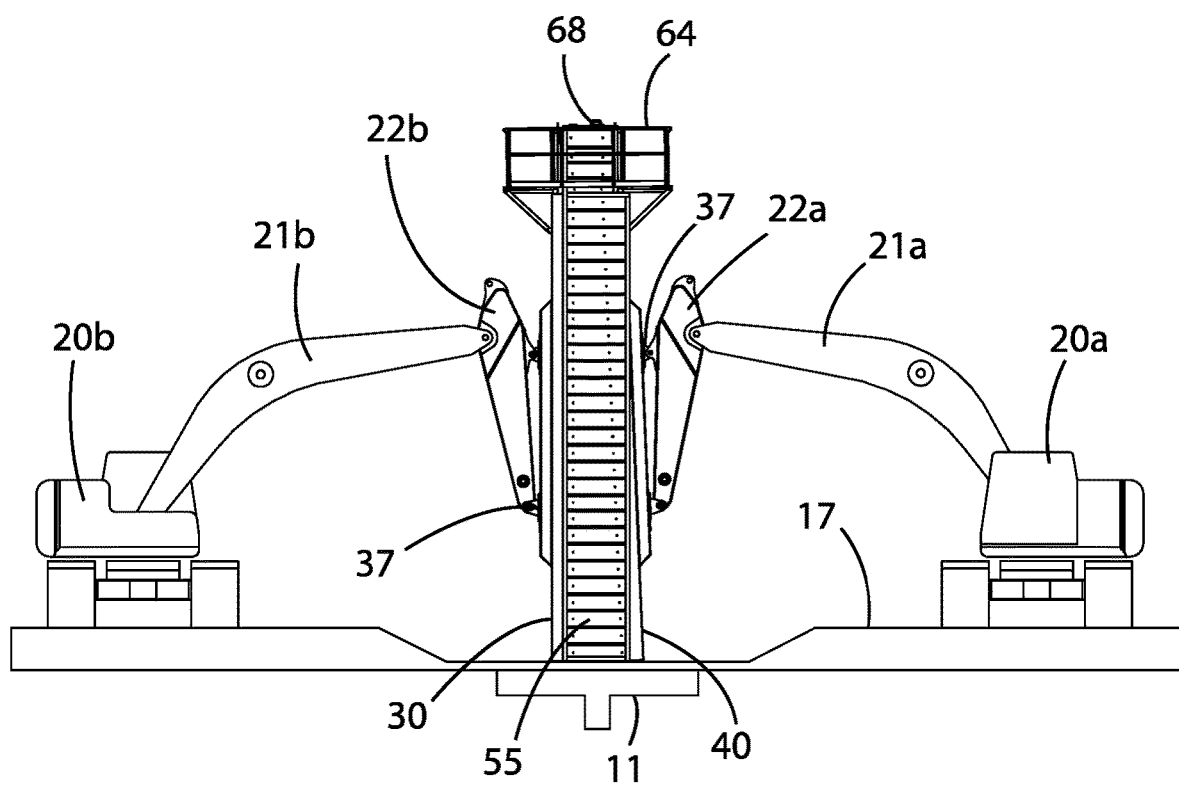
FIG. 9 is a side view of a concrete forming system in use in accordance with an example embodiment.

FIGS. 1-10 illustrate a first exemplary embodiment which includes a first wall 30, a second wall 40, a first sidewall 50, and a second sidewall 55. As shown in FIG. 1, the first wall 30 may include a first end 31, a second end 32, an upper end 33, a lower end 34, an outer surface 35, and an inner surface 36. The lower end 34 of the first wall 30 is positioned on the ground surface 17 and kept in place by the vehicle 20. The first wall 30 includes an outer surface 35 which faces toward the vehicle 20 and an inner surface 36 which faces away from the vehicle 20 and toward the second wall 40 when the second wall 40 is in place, such as shown in FIG. 9.

Figure 5:
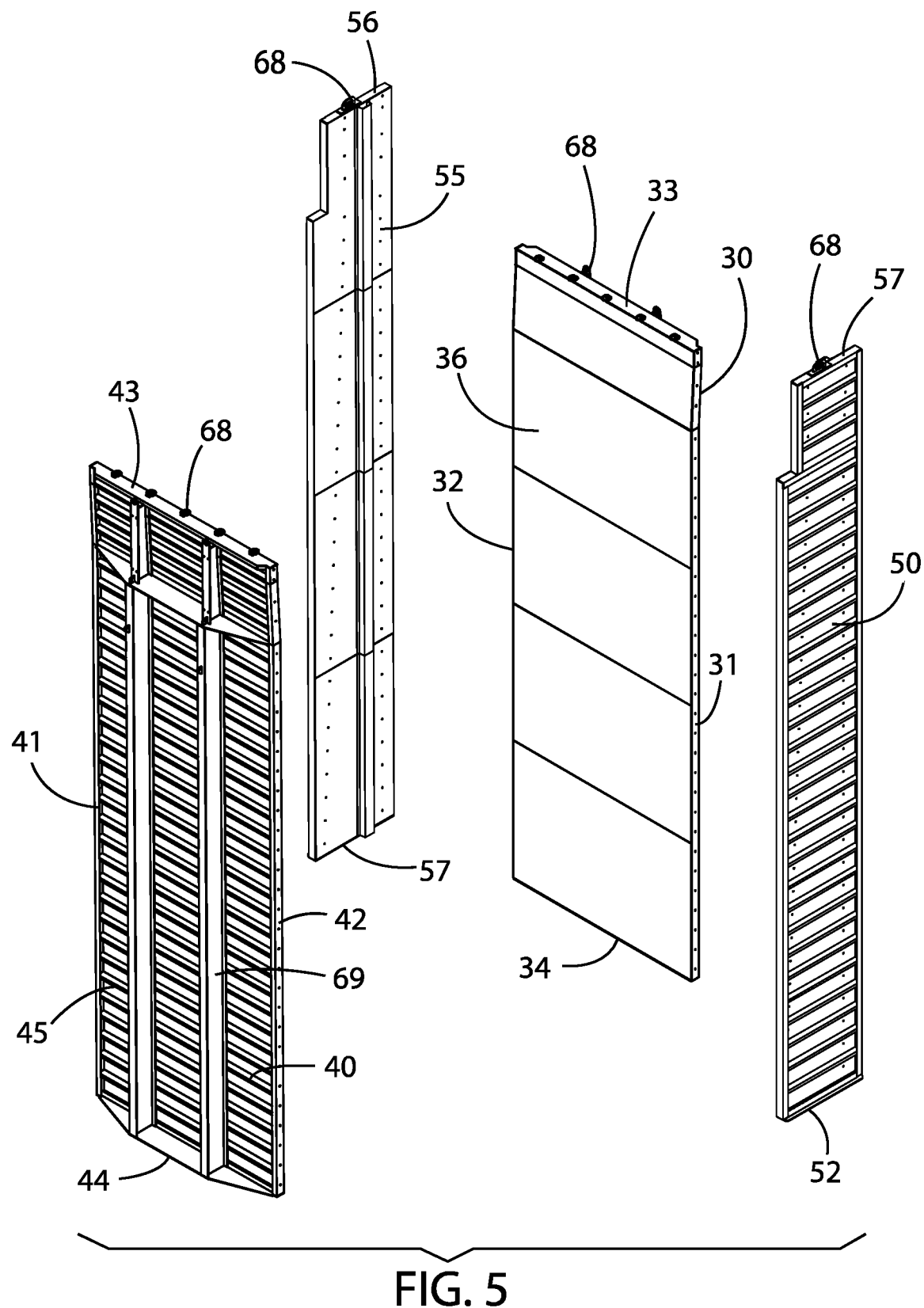
FIG. 5 is a frontal exploded view of a concrete forming system in accordance with an example embodiment.
Figure 6:
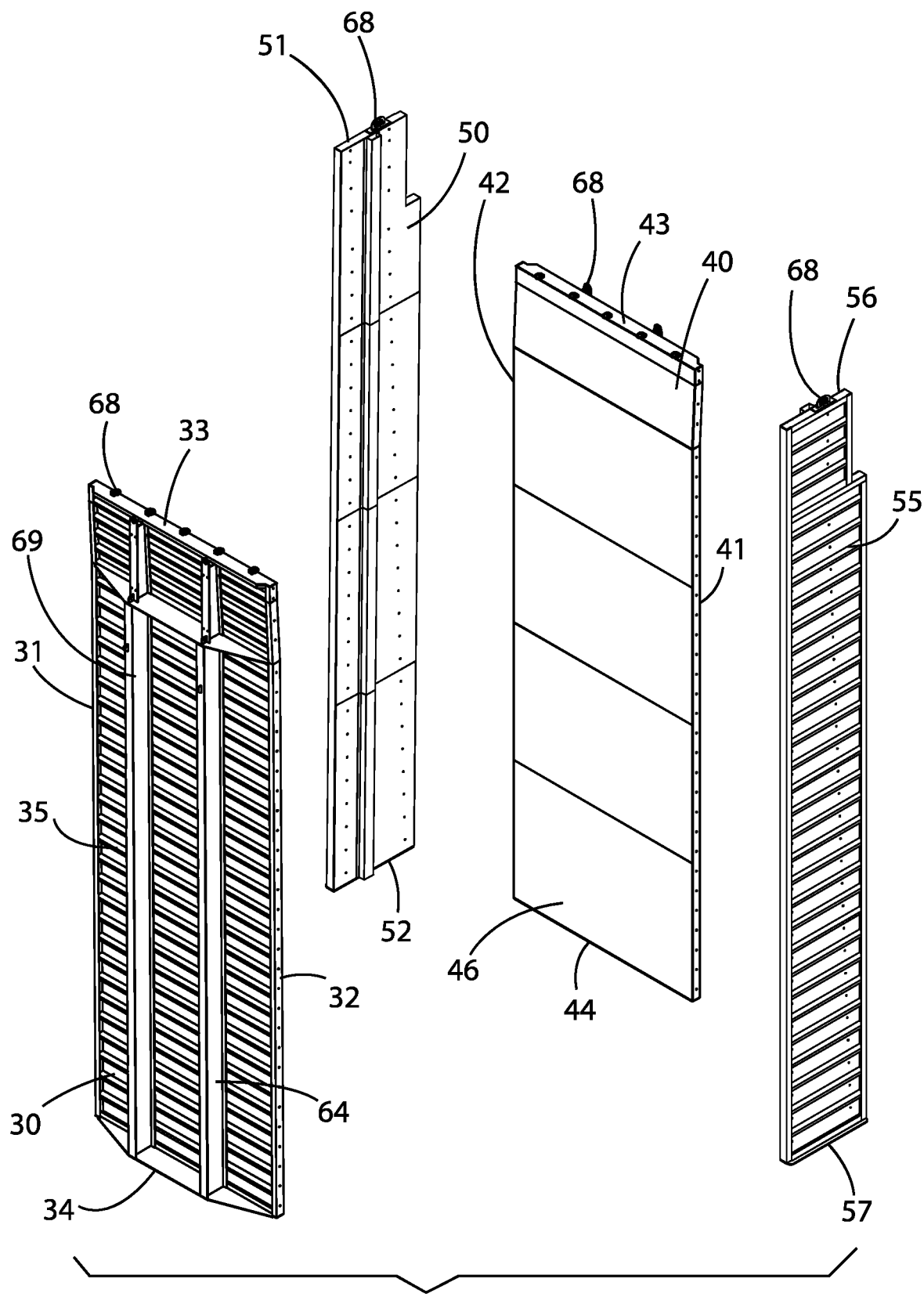
FIG. 6 is a rear exploded view of a concrete forming system in accordance with an example embodiment.
Figure 7:
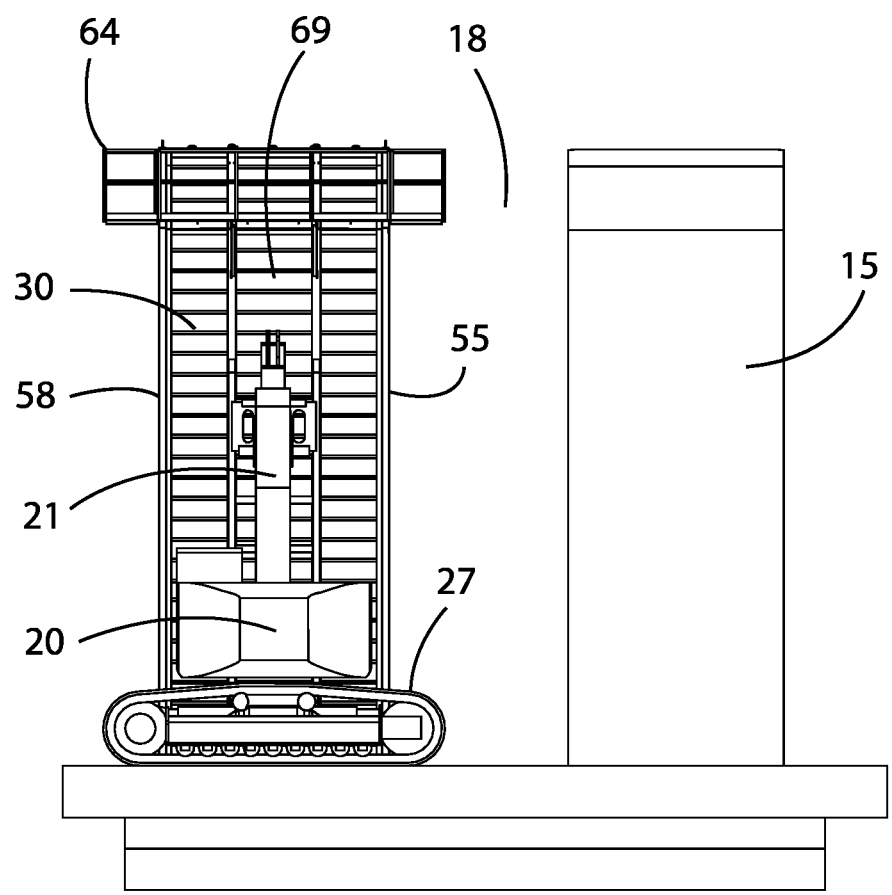
FIG. 7 is a frontal view of a concrete forming system in use in accordance with an example embodiment.
Figure 26:
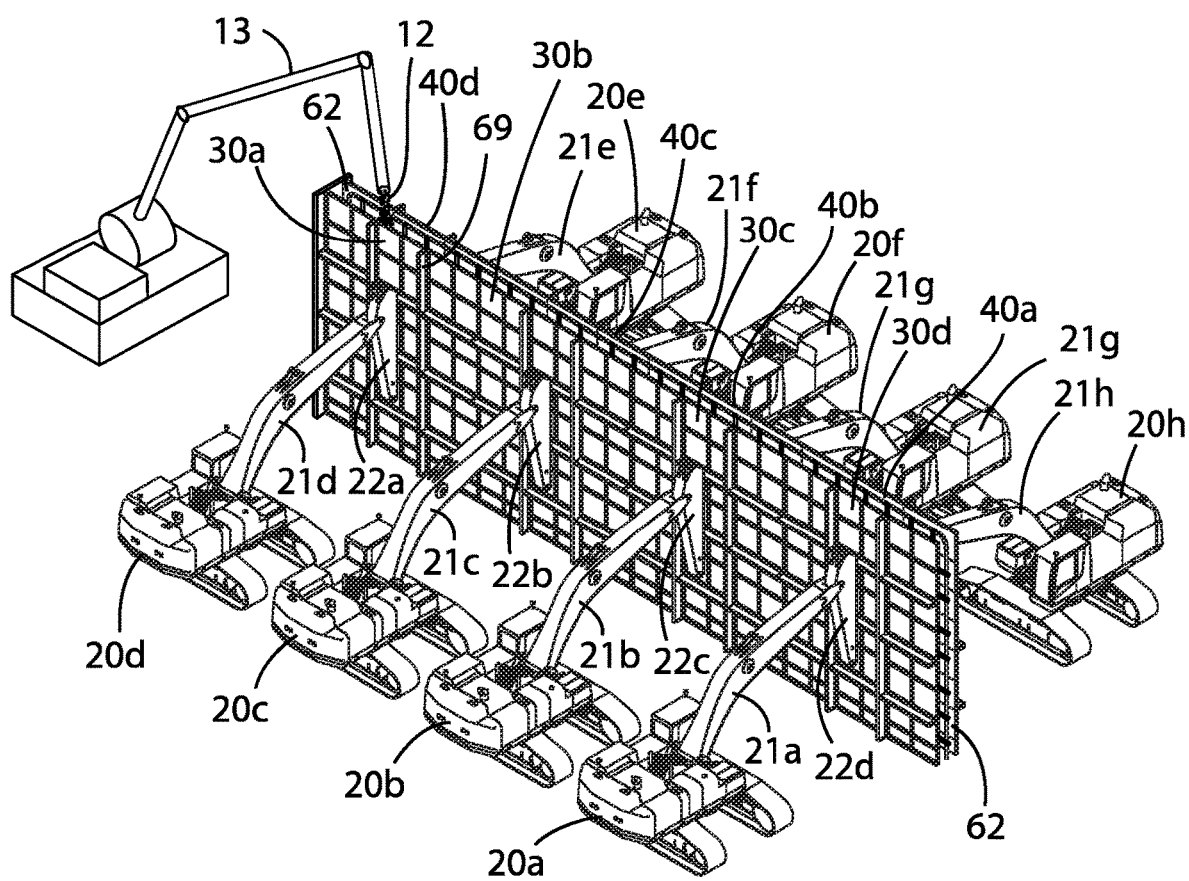
FIG. 26 is an upper perspective view of four sets of walls being supported by vehicles as concrete is poured in accordance with an example embodiment of a concrete forming system.

As shown in FIGS. 5-6, the second wall 40 similarly includes a first end 41, a second end 42, an upper end 43, a lower end 44, a first sidewall 50, and a second sidewall 55. The lower end 44 of the second wall 40 is positioned on the ground surface 17 and kept in place by a vehicle 20. The second wall 40 is generally positioned in opposing, spaced-apart relationship with respect to the first wall 30 such as shown in FIG. 26. The second wall 40 may include an outer surface 45 which faces toward the vehicle 20 and an inner surface 46 which faces away from the vehicle 20.

FIGS. 1-8 illustrate an embodiment which includes a pair of sidewalls 50, 55. As best shown in FIG. 5, a first sidewall 50 may be connected between the first end 31 of the first wall 30 and the first end 41 of the second wall 40. A second sidewall 55 may be connected between the second end 32 of the first wall 30 and the second end 42 of the second wall 40. In such a manner, a cavity 62 is defined between the first wall 30, the second wall 40, the first side wall 50, and the second sidewall 55.

The first and second walls 30, 40 may comprise different orientations to produce different types of structures 16. For example, both the first and second walls 30, 40 may be in an upright, vertical orientation to create a uniform-width wall. In other embodiments, the first wall 30 may be diagonally oriented and the second wall 40 may be vertically oriented, so as to produce a slanted face on the resulting structure 16. Both walls 30, 40 could be diagonally oriented toward each other to produce a triangular-shaped wall. Any other orientation or configuration may be utilized.

As shown in FIG. 6, the first sidewall 50 may comprise an upper end 51 and a lower end 52. The first sidewall 50 may be removably connected between the first and second walls 30, 40. The second sidewall 55 may comprise an upper end 56 and a lower end 56. The second sidewall 55 may be removably connected between the first and second walls 30, 40. In other embodiments, the sidewalls 50, 55 could be fixedly attached or integrally formed with the first and second walls 30, 40.

The inner surfaces 36, 46 of the walls 30, 40 are preferably comprised of a material to which concrete 12 will not adhere as it cures and solidifies. In other words, the inner surfaces 36, 46 of the walls 30, 40 are preferably comprised of a material which allows the walls 30, 40 to be pulled or otherwise moved away from the solidified concrete 12 after curing without breaking off pieces of the solidified concrete 12 (such as if the concrete 12 were to stick to the inner surfaces 36, 46 of the walls 30, 40).

Figure 10:
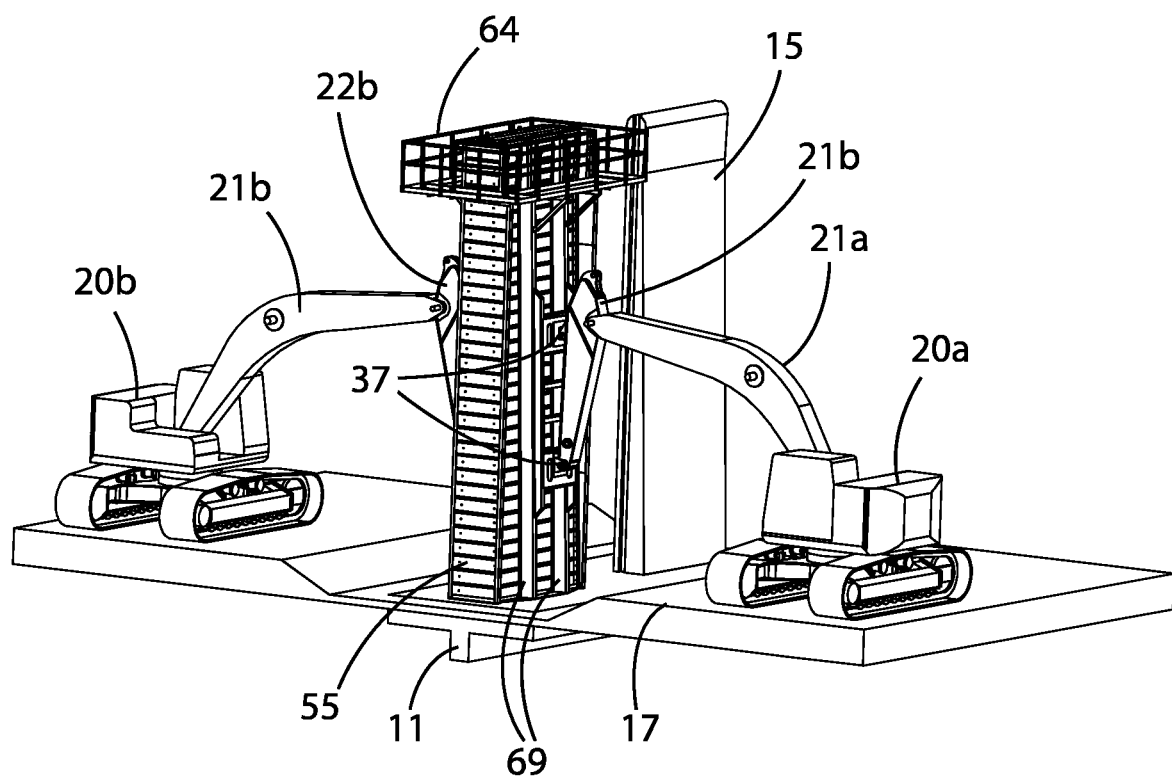
FIG. 10 is a side perspective view of a concrete forming system in use in accordance with an example embodiment.

The outer surfaces 36, 46 of the walls 30, 40 each include a coupler 37, 47 which is adapted to removably engage with a corresponding arm coupler 22 such as shown in FIGS. 8-10. The first wall 30 may include a first coupler 37 on its outer surface 36 and the second wall 40 may include a second coupler 47 on its outer surfaces 46. As shown in FIG. 12, the couplers 37, 47 may comprise structures such as rods, clips, brackets, or the like to which the corresponding arm couplers 22 may be connected. The arm couplers 22 may be removably connected to the couplers 37, 47.

In some embodiments, the couplers 37, 47 may comprise quick-connect and quick-disconnect couplers 37, 47. In such embodiments, manipulation of the arm 21 of the vehicle 20 may be utilized to easily connect the arm coupler 22 to a corresponding coupler 37, 47 or disconnect the arm coupler 22 from a corresponding coupler 37, 47.

When the arm 21 of the vehicle 20 is coupled to a wall 30, 40 via the arm coupler 22 and coupler 37, 47, the arm 21 may be manipulated to move or otherwise adjust the wall 30, 40 to which the arm 21 is connected. In such a manner, the wall 30, 40 may be positioned at a desired location on a ground surface 17 in a desired orientation to be used to form the structure 16 via curing of liquid concrete 12.

FIGS. 8-10 illustrate a pair of vehicles 20a, 20b which are being utilized to support a concrete form comprised of a first wall 30, a second wall 40, a first sidewall 50, and a second sidewall 55. The first vehicle 20a is connected to the first wall 30; with the arm 21 of the first vehicle 20a being connected to the first coupler 37 of the first wall 40. The second vehicle 20b is connected to the second wall 40; with the arm 21 of the second vehicle 20b being connected to the second coupler 47 of the second wall 40. In this manner, both walls 30, 40 are supported in position while concrete 12 is poured into the cavity 62 and retained in such a position as the liquid concrete 12 cures into a solidified concrete 12 to form the structure 16.

In the embodiment shown in FIG. 8, scaffolding 64 surrounds the upper ends 33, 43, 51, 56 of the walls 30, 40, 50, 55. This scaffolding 64 will allow an individual to safely service the walls 30, 40, 50, 55 as needed. The upper ends 33, 43, 51, 56 of the walls 30, 40, 50, 55 may include wall anchors 68 such as clips or the like which may be connected to a boom if necessary for moving the walls 30, 40, 50, 55. Alternatively, safety harnesses on workers may be connected to these wall anchors 68 to prevent injury.

FIGS. 11-26 illustrate an embodiment of the concrete forming system 10 which may retain the walls 30, 40 in position without the use of sidewalls 50, 55 or any type of cross-tie. In other words, the walls 30, 40 are retained in opposing, spaced-apart relationship without being connected to each other; the first wall 30 is not connected to the second wall 40. This is possible due to the use of the vehicles 20 which retain the walls 30, 40 in position without the necessity of the walls 30, 40 being interconnected to each other.

As shown in FIGS. 22-25, such an embodiment may allow for more maneuverability in adjusting the orientation of the walls 30, 40. As shown in FIG. 20, the arm coupler 22 in such an embodiment may comprise a plate-like member which is connected between the arm 21 and the wall 30, 40. The arm coupler 22 may be removably or fixedly attached to the wall 30, 40, such as via the couplers 37, 47 on the wall 30, 40.

In some embodiments, it may be desirable to adjust the attitude, position, and/or orientation of the walls 30, 40. Such adjustments may be utilized to accommodate for terrain variances that may be encountered when constructing the structure 16. Different embodiments may allow adjustment of the walls 30, 40 about different numbers of axes depending on the needs of a particular area, terrain, or ground surface 17. In some embodiments, the walls 30, 40 may be rotated about up to three axes (pitch, yaw, roll) with respect to the ground surface 17 or arm 21 of the vehicle 20 to which the particular wall 30, 40 is connected.

Figure 22:
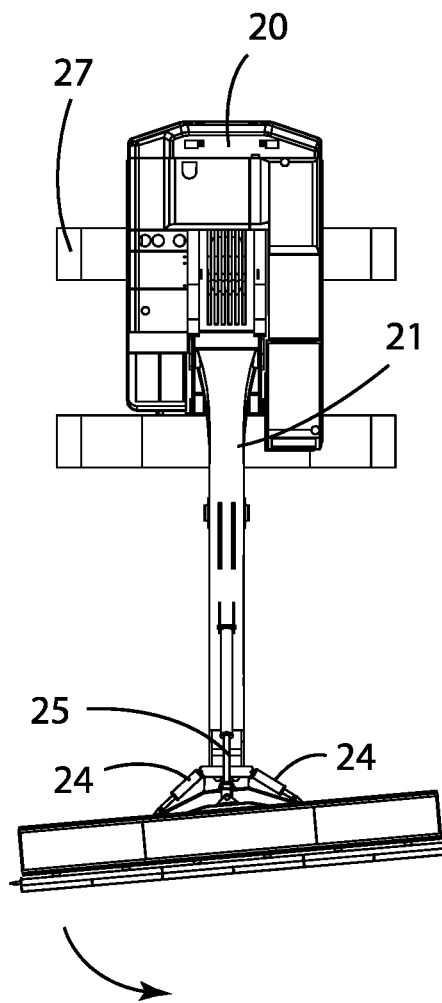
FIG. 22 is a top view illustrating rotation of a wall in a first direction in accordance with an example embodiment of a concrete forming system.
Figure 23:
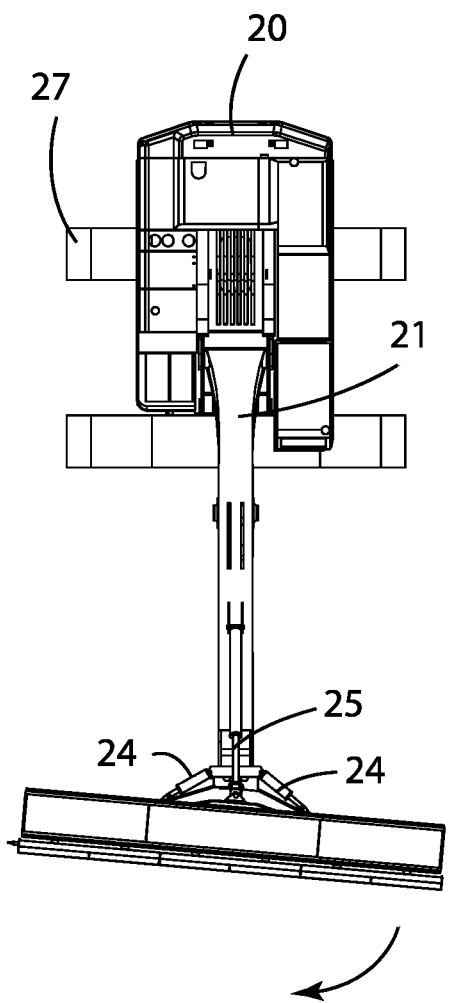
FIG. 23 is a top view illustrating rotation of a wall in a second direction in accordance with an example embodiment of a concrete forming system.

FIGS. 22-25 illustrate an embodiment which is rotatable about two axes: an X-axis with respect to the ground surface 17 (pitch) and a Y-axis with respect to the ground surface 17 (yaw). Such an embodiment may include actuators 24, 25 which are utilized to rotate or otherwise adjust the attitude or orientation of the wall 30, 40 with respect to the arm 21 to which the wall 30, 40 is interconnected. As shown in FIGS. 22-23, a pair of yaw actuators 24 may be connected between the arm 21 and the arm coupler 22. The yaw actuators 24 are adapted to adjust the yaw of the arm coupler 22 with respect to the arm 21. Because the wall 30, 40 is connected to the arm coupler 22, such as via a coupler 37, 47 on the wall 30, 40, the wall 30, 40 will similarly be adjusted along with the arm coupler 22.

In the embodiment shown in FIG. 22, a first yaw actuator 24 is connected between the hinge 23 and a first side of the arm coupler 22. A second yaw actuator 24 is connected between the hinge 23 and a second side of the arm coupler 22. Extending the first yaw actuator 24 as the second yaw actuator 24 is retracted will adjust the yaw of the arm coupler 22 in a first direction. Retracting the first yaw actuator 24 as the second yaw actuator 24 is extended will adjust the yaw of the arm coupler 22 (and, as a result, the wall 30, 40) in a second direction.

Figure 24:
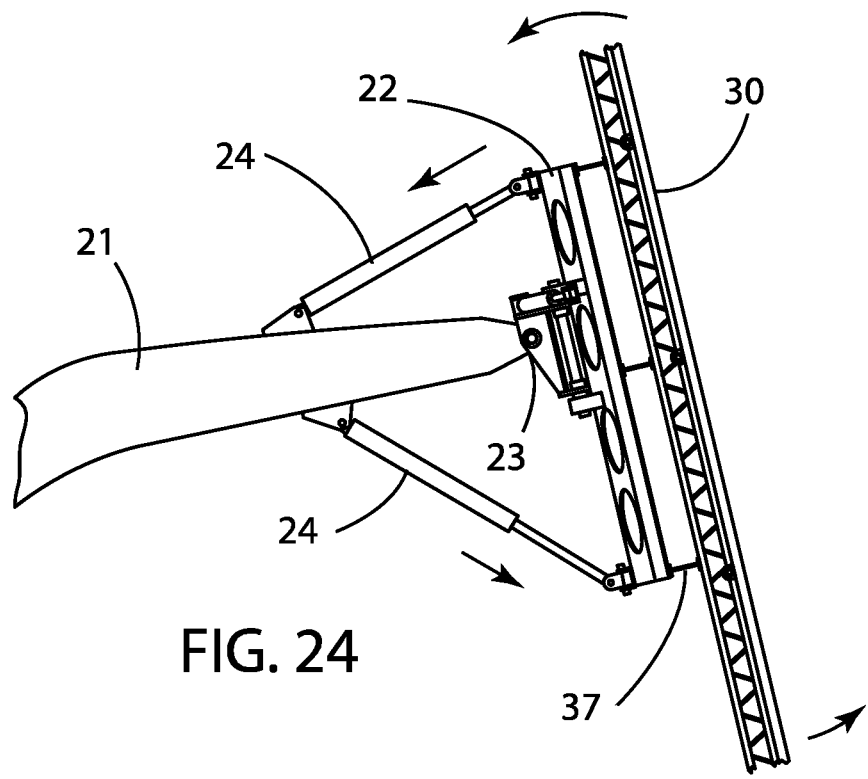
FIG. 24 is a side view of a first wall being rotated in a first direction in accordance with an example embodiment of a concrete forming system.
Figure 25:
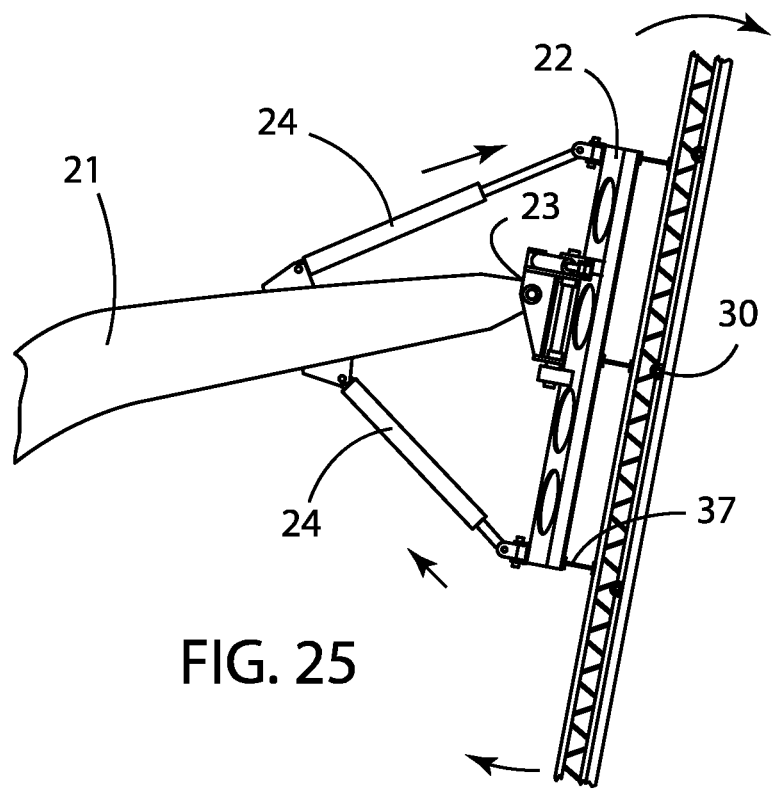
FIG. 25 is a side view of a first wall being rotated in a second direction in accordance with an example embodiment of a concrete forming system.

As shown in FIGS. 24-25, a pair of pitch actuators 25 may also be connected between the arm 21 and the arm coupler 22. The pitch actuators 25 are adapted to adjust the pitch of the arm coupler 22 with respect to the arm 21. Because the wall 30, 40 is connected to the arm coupler 22, the wall 30, 40 will similarly be adjusted along with the arm coupler 22.

In the embodiment shown in FIG. 24, a first pitch actuator 25 is connected between the arm 21 and an upper end of the arm coupler 22. A second pitch actuator 25 is connected between the arm 21 and a lower end of the arm coupler 22. Extending the first pitch actuator 25 as the second pitch actuator 25 is retracted will adjust the pitch of the arm coupler 22 in a first direction. Retracting the first pitch actuator 25 as the second pitch actuator 25 is extended will adjust the pitch of the arm coupler 22 (and, as a result, the wall 30, 40) in a second direction.

By utilizing the actuators 24, 25, the walls 30, 40 may be adjusted to a desired orientation before being held in place for concrete 12 to be poured into the cavity 62 between the walls 30, 40. When the walls 30, 40 are so oriented, additional supports 28, 29 may be interconnected between the vehicle 20 and the walls 30, 40 for added stability.

In some embodiments, the wall 30, 40 may be adjusted to rotate about three axes. FIGS. 39-43 illustrate an embodiment which is rotatable about three axes: an X-axis with respect to the ground surface 17 (pitch); a Y-axis with respect to the ground surface 17 (yaw); and a Z-axis with respect to the ground surface 17 (roll). FIGS. 24-25 illustrate a wall 30, 40 being rotated about a first axis to adjust pitch of the wall 30, 40. FIGS. 22-23 illustrate a wall 30, 40 being rotated about a second axis to adjust yaw of the wall 30, 40. FIGS. 43A and 43B illustrate a wall 30, 40 being rotated about a third axis to adjust roll of the wall 30, 40.

FIGS. 39-43 illustrate an alternate embodiment of an arm coupler 80 adapted to adjust the attitude of the wall 30, 40 with respect to the arm 21 to which the arm coupler 80 is connected (roll, pitch, yaw). Such an arm coupler 80 may comprise a frame 81 which is connected to the corresponding couplers 37, 47 on the wall 30, 40.

Figure 39:
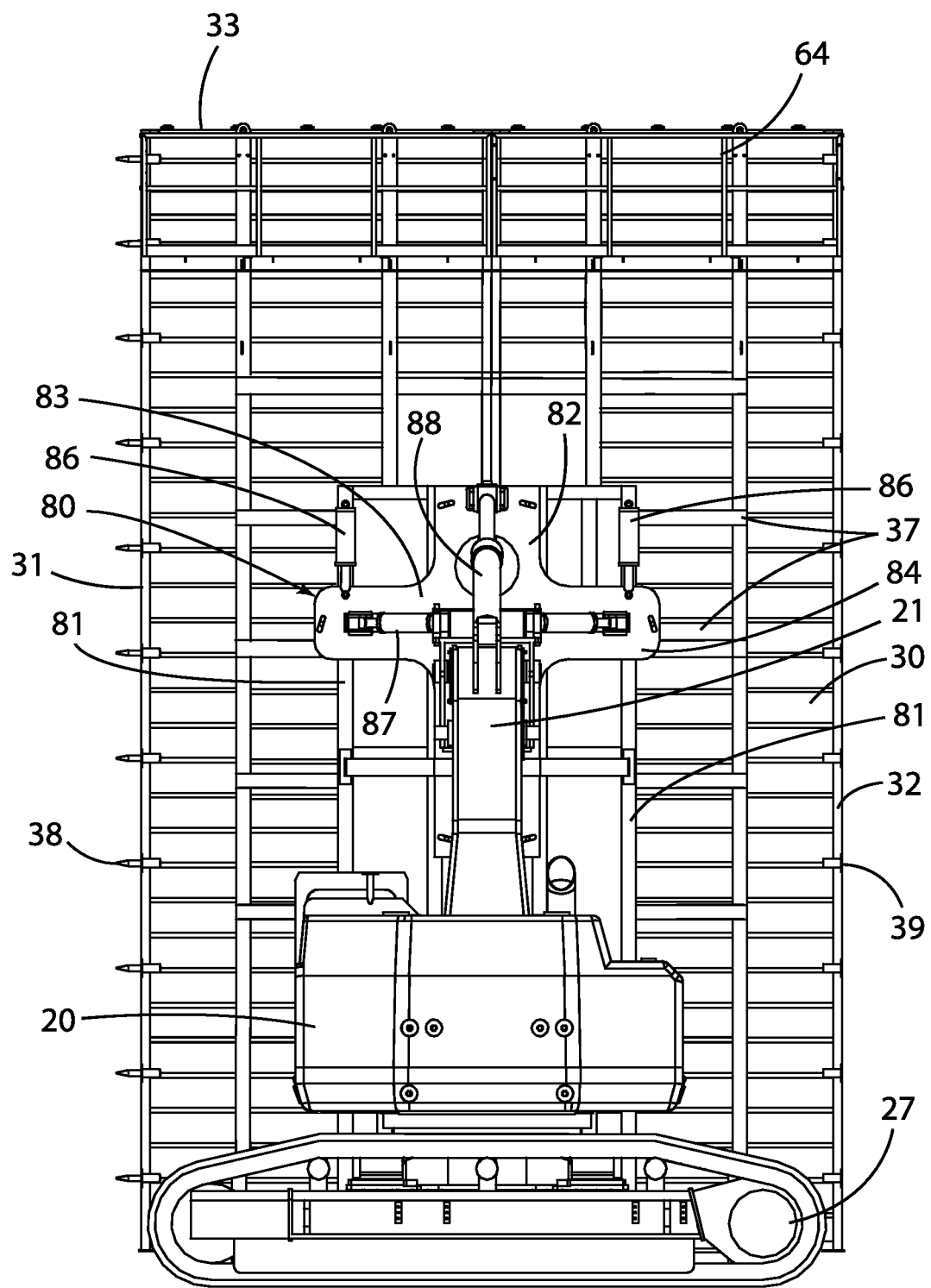
FIG. 39 is a frontal view of a wall being supported by a vehicle in accordance with an example embodiment of a concrete forming system.

In the exemplary embodiment of FIG. 39, first couplers 37 of a first wall 30 are illustrated as comprising a plurality of elongated members extending between the first end 31 and the second end 32 of the first wall. The frame 81 comprises a plurality of elongated members which extend perpendicular with respect to the first couplers 37 of the first wall 30. The frame 81 may be fixedly or removably connected to the coupler 37, 47 of a wall 30, 40. In some embodiments, the frame 81 may be welded to the coupler 37, 47 of a wall 30, 40.

Figure 40:
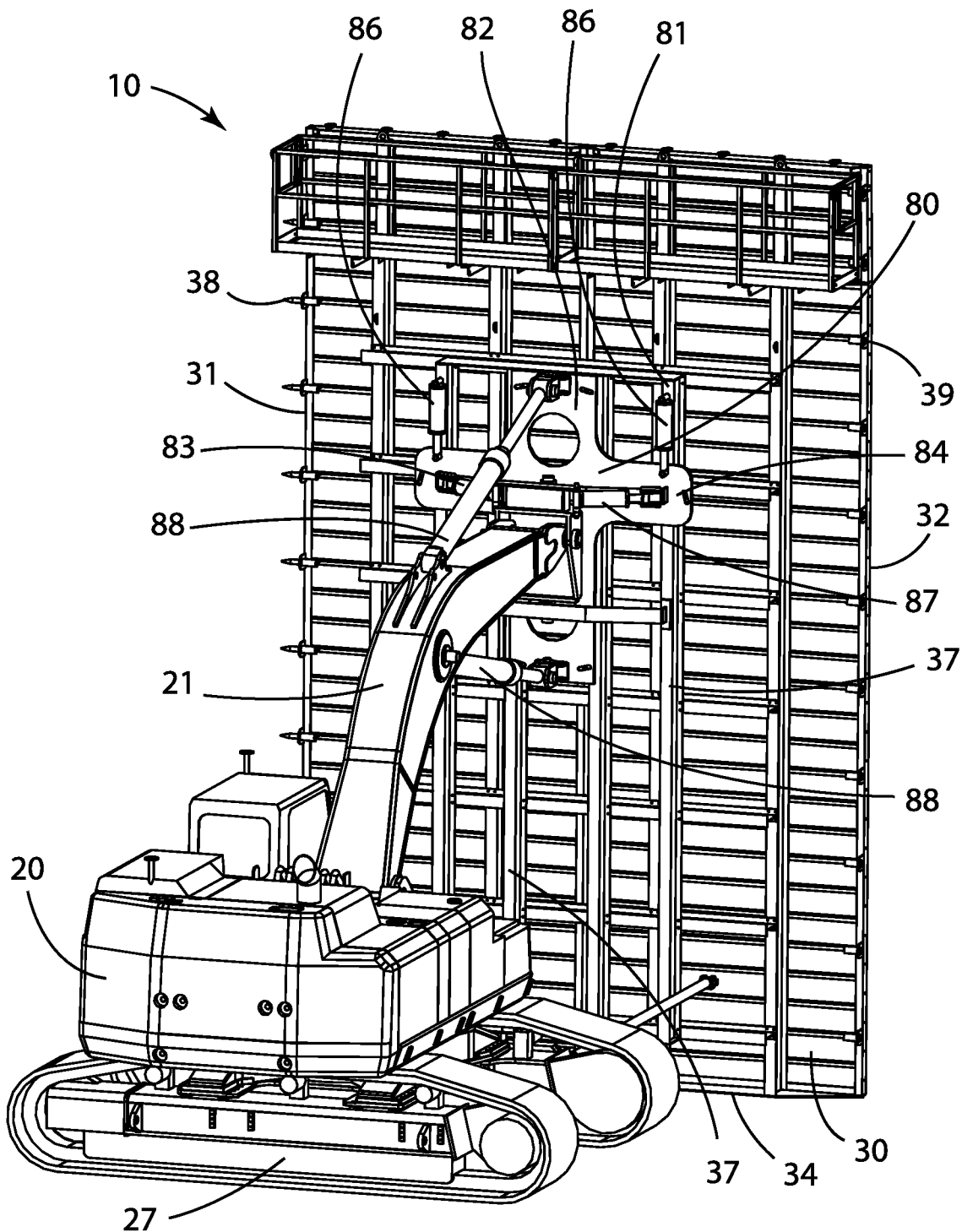
FIG. 40 is a frontal perspective view of a wall being supported by a vehicle in accordance with an example embodiment of a concrete forming system.

FIG. 40 illustrates that the arm coupler 80 includes a hub 82 which is connected to the arm 21 of the vehicle 20 by a hinge 85. The hub 82 is illustrated as comprising a cross-configuration, including a first arm 83 extending in a first direction and a second arm 84 extending in a second direction. It should be appreciated that alternate configurations of the hub 82 may be utilized. The hub 82 is shown as being connected to the frame 81 which in turn is connected to the wall 30, 40 by corresponding couplers 37, 47 on the wall 30, 40. The manner in which the hub 82 is connected to the frame 81 may vary in different embodiments. The hub 82 and frame 81 could be welded together or otherwise interconnected.

Figure 42:
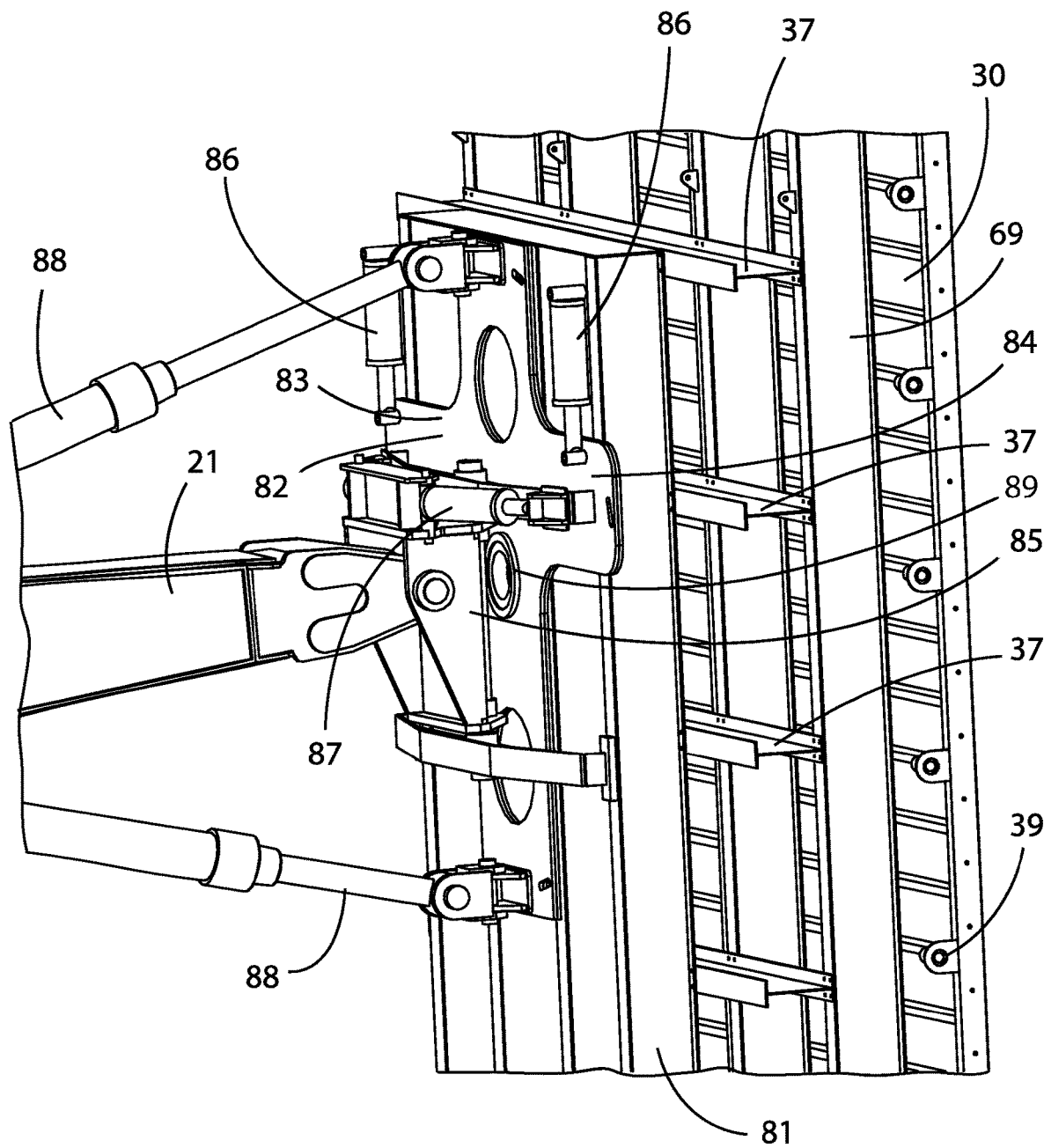
FIG. 42 is a side perspective view of an arm coupler and actuators in accordance with an example embodiment of a concrete forming system.
Figure 43A:
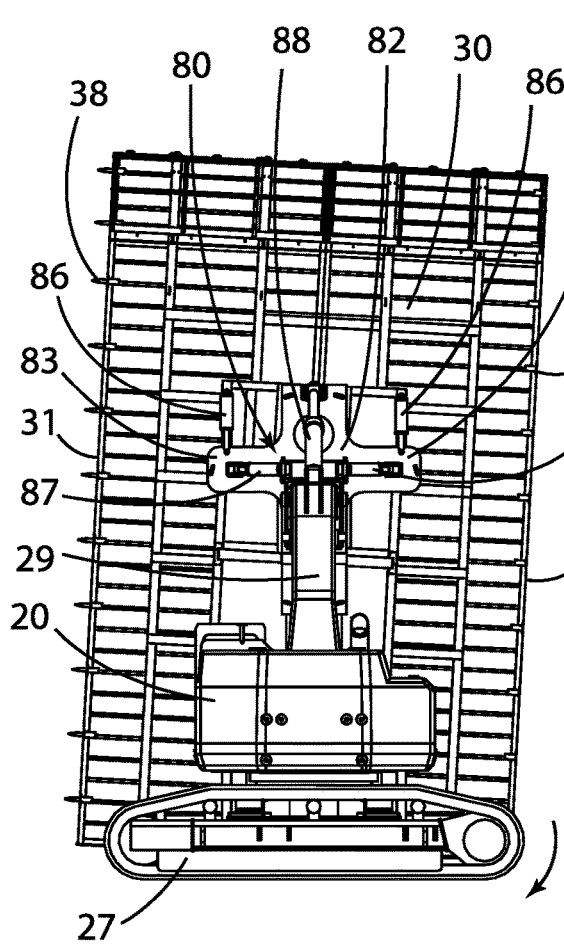
FIG. 43A is a frontal view of a wall being rotated in a first direction in accordance with an example embodiment of a concrete forming system.
Figure 43B:
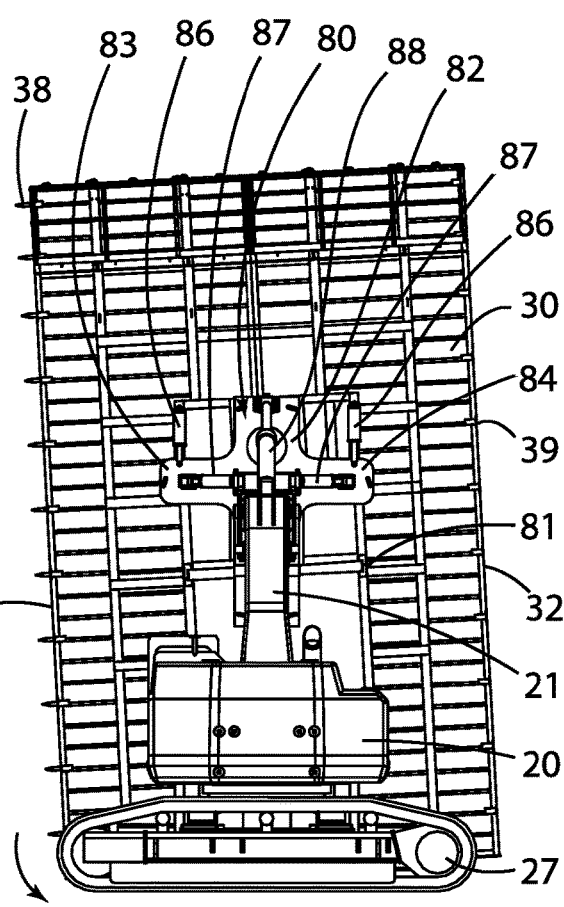
FIG. 43B is a frontal view of a wall being rotated in a second direction in accordance with an example embodiment of a concrete forming system.

As best shown in FIG. 42, the arm coupler 80 may include a bearing 89 which allows rotation of the arm coupler 80. More specifically, the embodiment of FIG. 42 includes a bearing 89 near the center of the hub 82 such that the hub 82 may rotate. The bearing 89 is utilized to allow attitude adjustment (roll) using the roll actuators 86 as discussed herein.

The arm 21 is only connected to the arm coupler 80 by the actuators 86, 87, 88. In this manner, the actuators 86, 87, 88 may control the attitude of the arm coupler 80 and interconnected wall 30, 40. The bearing 89 allows the roll of the wall 30, 40 to be adjusted to account for variations in the ground surface 17.

Figure 41:
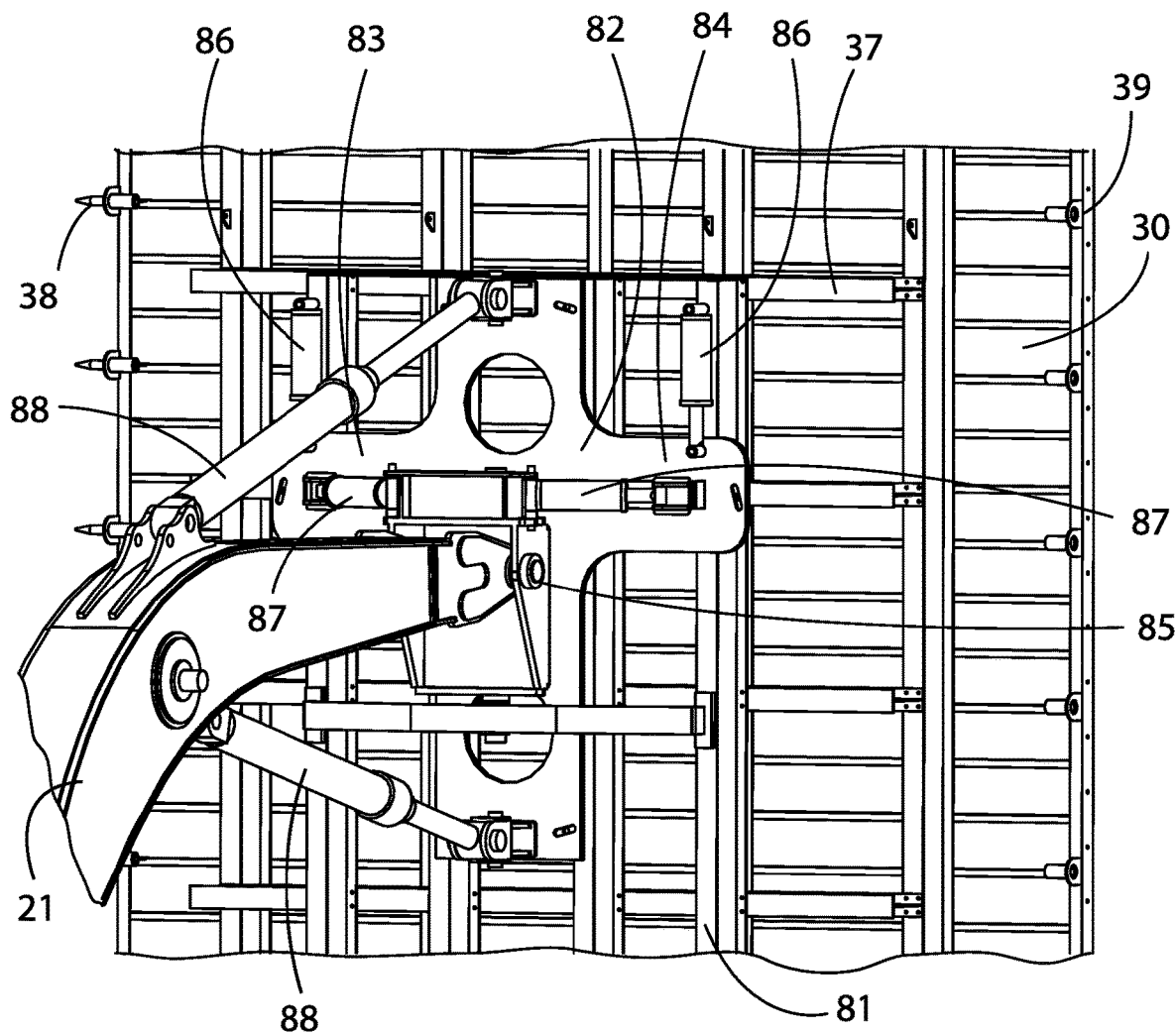
FIG. 41 is a frontal perspective view of an arm coupler and actuators in accordance with an example embodiment of a concrete forming system.

As shown in FIG. 41, multiple actuators 86, 87, 88 are utilized to effectuate attitude adjustment by three-axis rotation of the wall 30, 40 with respect to the arm 21 of the vehicle 20. Roll actuators 86 are illustrated which control rotation of the wall 30, 40 about a first axis (X-axis). Yaw actuators 87 are illustrated which control rotation of the wall 30, 40 with respect to a second axis (Y-axis). Pitch actuators 88 are illustrated which control rotation of the wall 30, 40 about a third axis (Z-axis).

As best shown in FIG. 42, the roll actuators 86 are each connected between the hub 82 and the frame 81. A bearing 89 in the hub 82 allows the frame 81, the hub 82 and by extension, the wall 30, 40 to rotate about the bearing 89 for roll adjustment. This is particularly useful for terrain variances. Although the figures illustrate only slight roll adjustments (3-5 degrees), it should be appreciated that larger degree changes may be supported for particular terrains.

As shown in FIG. 41, a first roll actuator 86 may be connected between the first arm 83 of the hub 82 and the frame 81. A second roll actuator 86 may be connected between the second arm 84 of the hub 82 and the frame 81. The roll actuators 86 are illustrated as extending vertically in a parallel orientation with respect to the frame 81. Extension/retraction of the roll actuators 86 adjusts the attitude (roll) of the wall 30, 40. FIG. 43A illustrates the wall 30, 40 being rolled a first direction by extension of the roll actuator 86 on the first arm 83. FIG. 43B illustrates the wall 30, 40 being rolled in a second direction by extension of the roll actuator 86 on the second arm 84.

As shown in FIG. 41, a first yaw actuator 87 may be connected between the hinge 85 and the first arm 83 of the hub 82 of the arm coupler 80. A second yaw actuator 87 may similarly be connected between the hinge 85 and the second arm 84 of the hub 82 of the arm coupler 80. The yaw actuators 87 may extend in opposite directions as shown in the figures. The yaw actuators 87 may be extended and/or retracted to adjust the yaw of the wall 30, 40.

As shown in FIG. 41, a first pitch actuator 88 extends between the arm 21 of the vehicle 20 and the upper end of the hub 82 of the arm coupler 80. A second pitch actuator 88 extends between the arm 21 of the vehicle 20 and the lower end of the hub 82 of the arm coupler 80. The pitch actuators 88 may be extended and/or retracted to adjust the pitch of the wall 30, 40.

Figure 13:
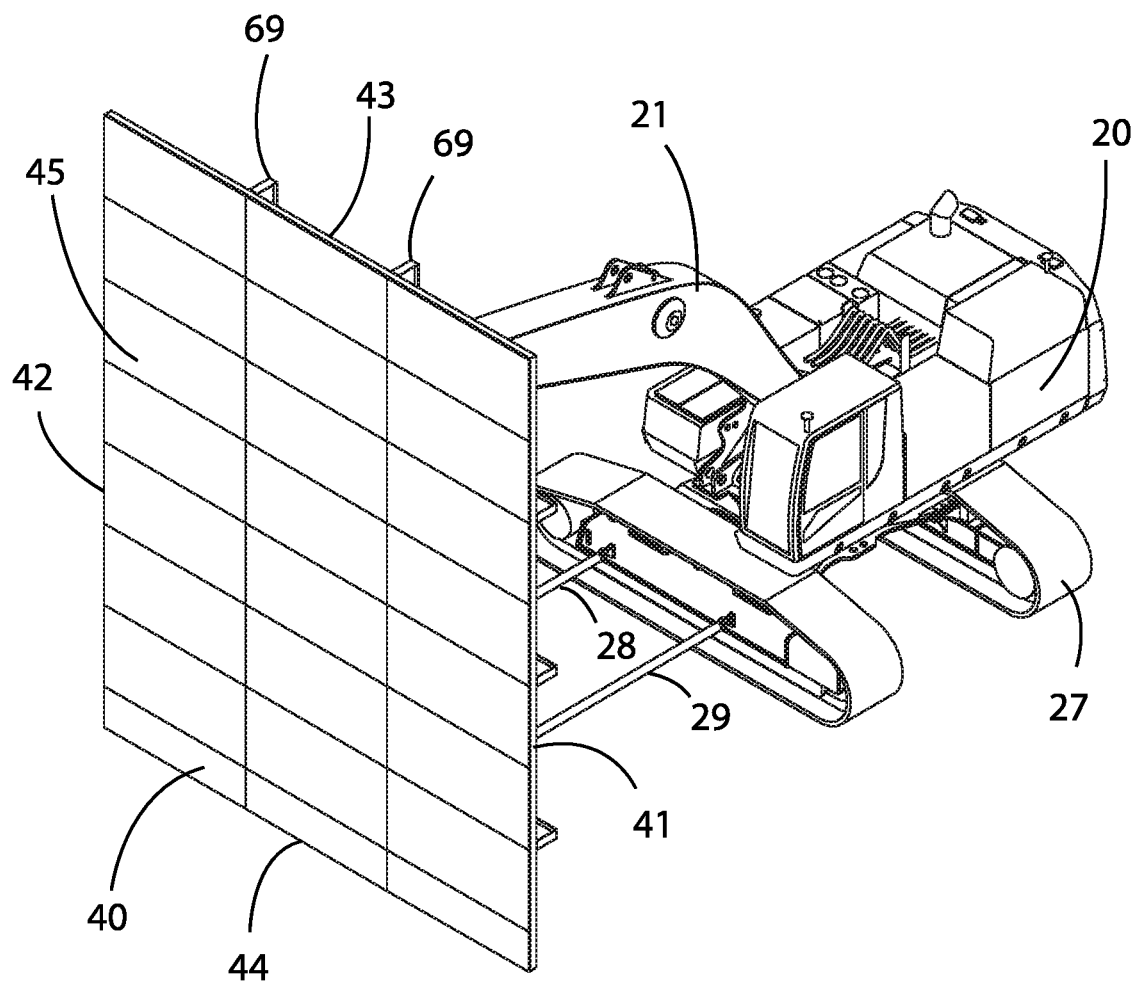
FIG. 13 is an upper perspective view of a vehicle supporting a second wall in accordance with an example embodiment of a concrete forming system.
Figure 14:
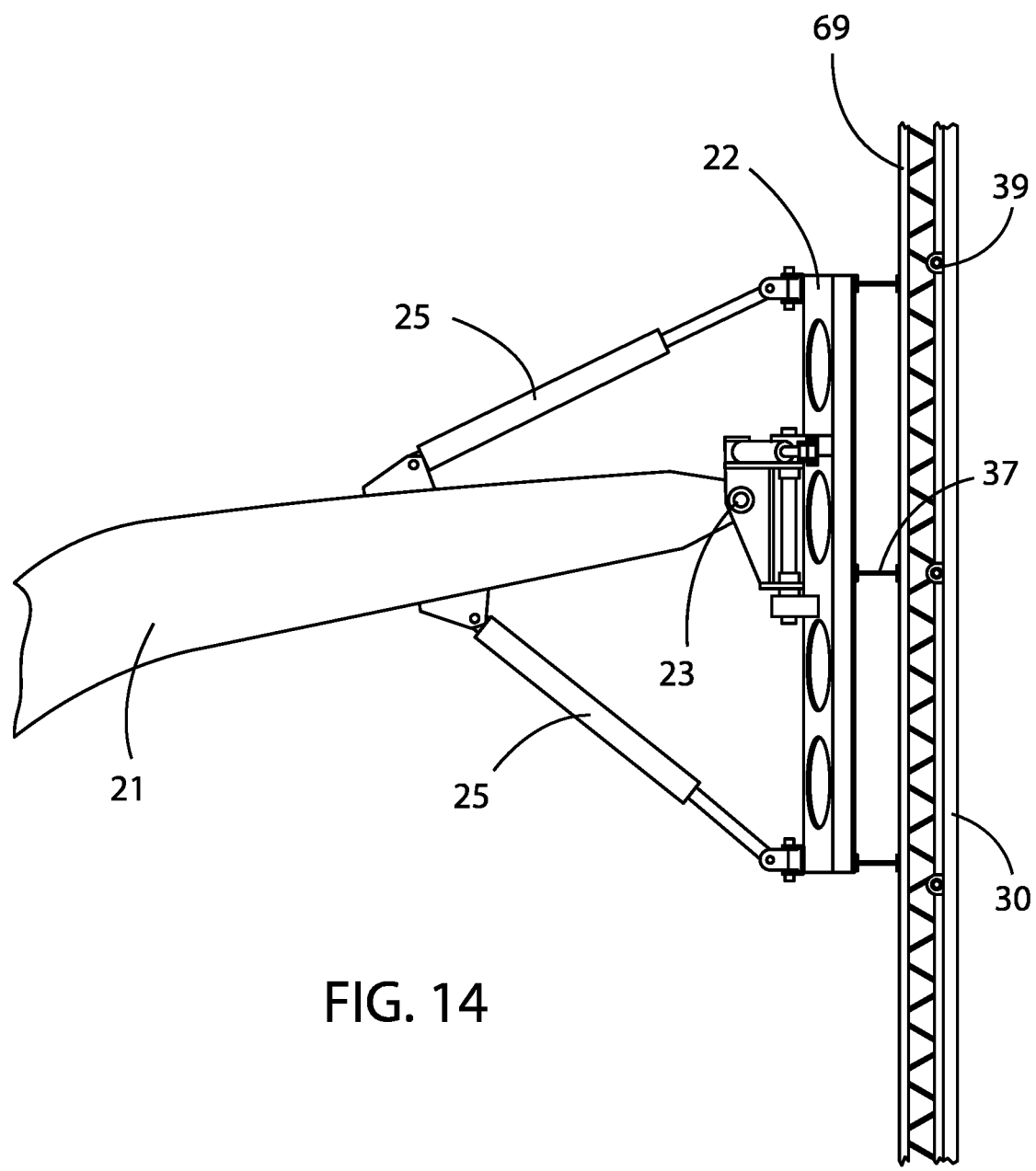
FIG. 14 is a side view of an arm supporting a first panel in accordance with an example embodiment of a concrete forming system.
Figure 15:
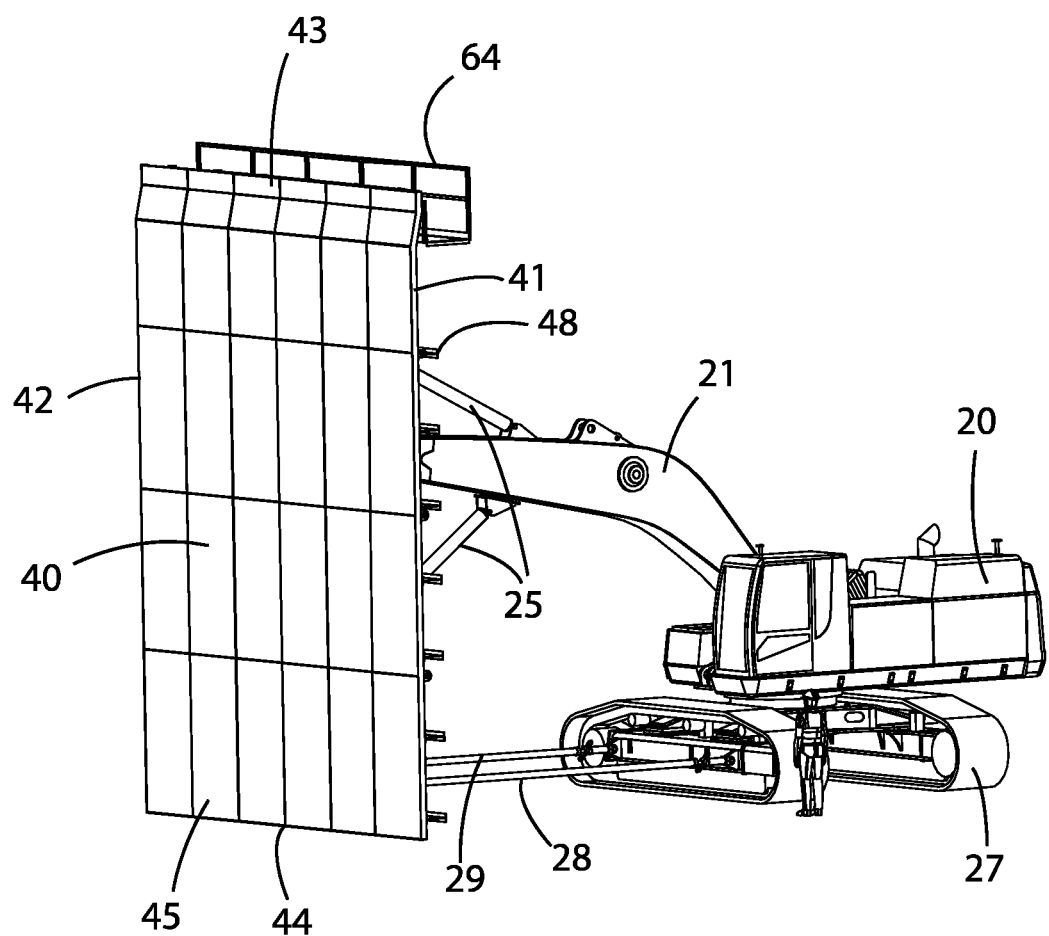
FIG. 15 is a frontal perspective view of a second panel being supported by a vehicle in accordance with an example embodiment of a concrete forming system.
Figure 21:
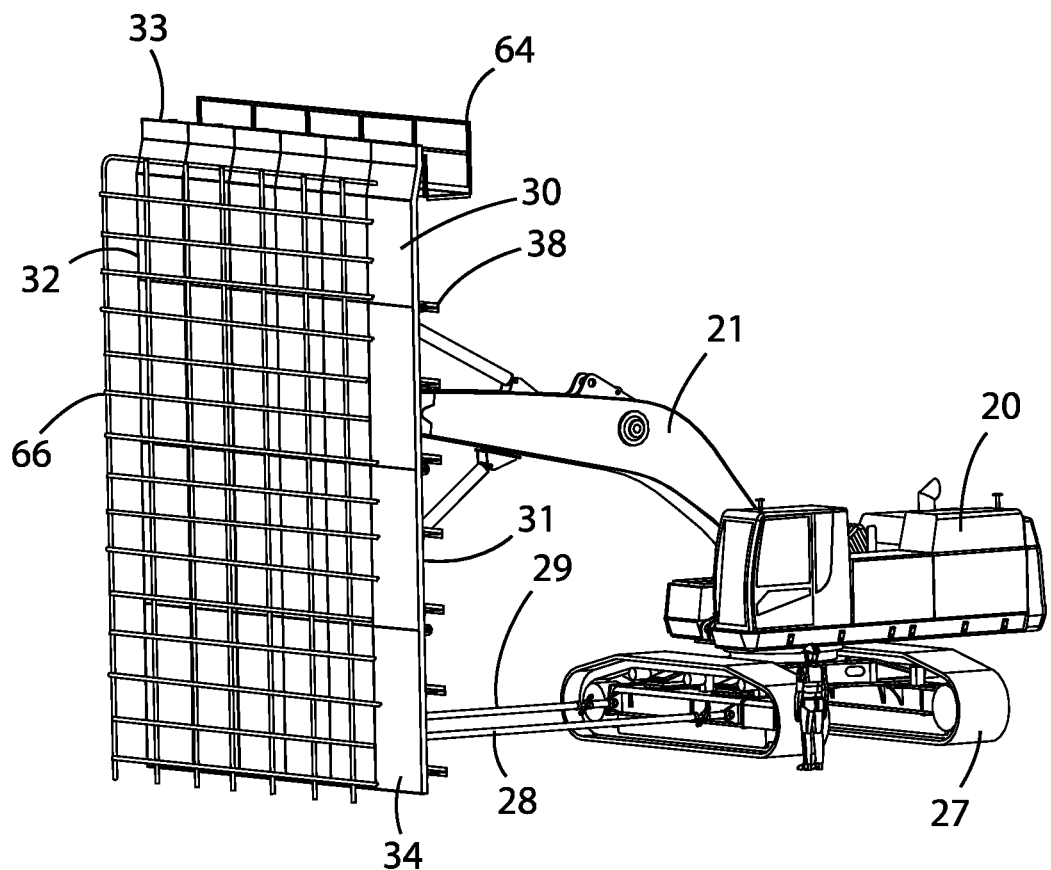
FIG. 21 is an upper perspective view of a first wall being supported by a vehicle in accordance with an example embodiment of a concrete forming system.

As shown in FIGS. 13, 15, and 21, the vehicle 20 may include a first support 28 extending from a first side of the vehicle 20 and a second support 29 extending from a second side of the vehicle 20. Each of the supports 28, 29 may comprise various configurations, such as an elongated member such as a rod as shown in the figures. The supports 28, 29 provide additional bracing for the wall 30, 40 when it is being held in position by the vehicle 20.

The supports 28, 29 are preferably movably connected to the vehicle 20 such that the supports 28, 29 may be raised into a storage/transport position or lowered into an engaged position to engage with the wall 30, 40. In the figures, the supports 28, 29 are illustrated as rotating between a vertical position and a horizontal position. Thus, the supports 28, 29 may be hingedly connected to the vehicle 20 by hinges as shown in the figures. Actuators may be provided to adjust the positions of the supports 28, 29. The location where the supports 28, 29 are connected to the vehicle 20 may vary in different embodiments and should not be construed as limited by the figures.

The supports 28, 29 may interconnect with the wall 30, 40 or may frictionally engage with the wall 30, 40. In the figures, the supports 28, 29 are illustrated as engaging with ribs 69 on the lower end 34, 44 of the outer surface 35, 45 of the relevant wall 30, 40. The supports 28, 29 may interconnect with any location on the wall 30, 40 in different embodiments.

The supports 28, 29 may be parallel with each other as shown in the figures. The supports 28, 29 may be individually controlled in some embodiments, or controlled together in other embodiments. When engaged with the wall 30, 40, the supports 28, 29 provide additional stability for the lower end 34, 44 of the wall 30, 40 to keep the wall 30, 40 in its desired orientation and location during curing.

As shown in FIG. 26, multiple sets of walls, each comprising a first wall 30 and an opposing second wall 40, may be daisy-chained together. The number of walls 30, 40 so interconnected may vary in different embodiments and for different types of resulting structures 16. For example, if a longer structure 16 is desired, additional walls 30, 40 may be daisy-chained onto the end to increase the effective length of the cavity 62 in which the concrete 12 is cured.

To effectuate interconnection of walls 30, 40, connectors 38, 48 and receivers 48, 49 may be utilized. The first wall 30 may include a first connector 38 on its first end 31 and a first receiver 39 on its second end 32. The second wall 40 may similarly include a second connector 48 on its first end 41 and a second receiver 49 on its second end 42.

Figure 16:
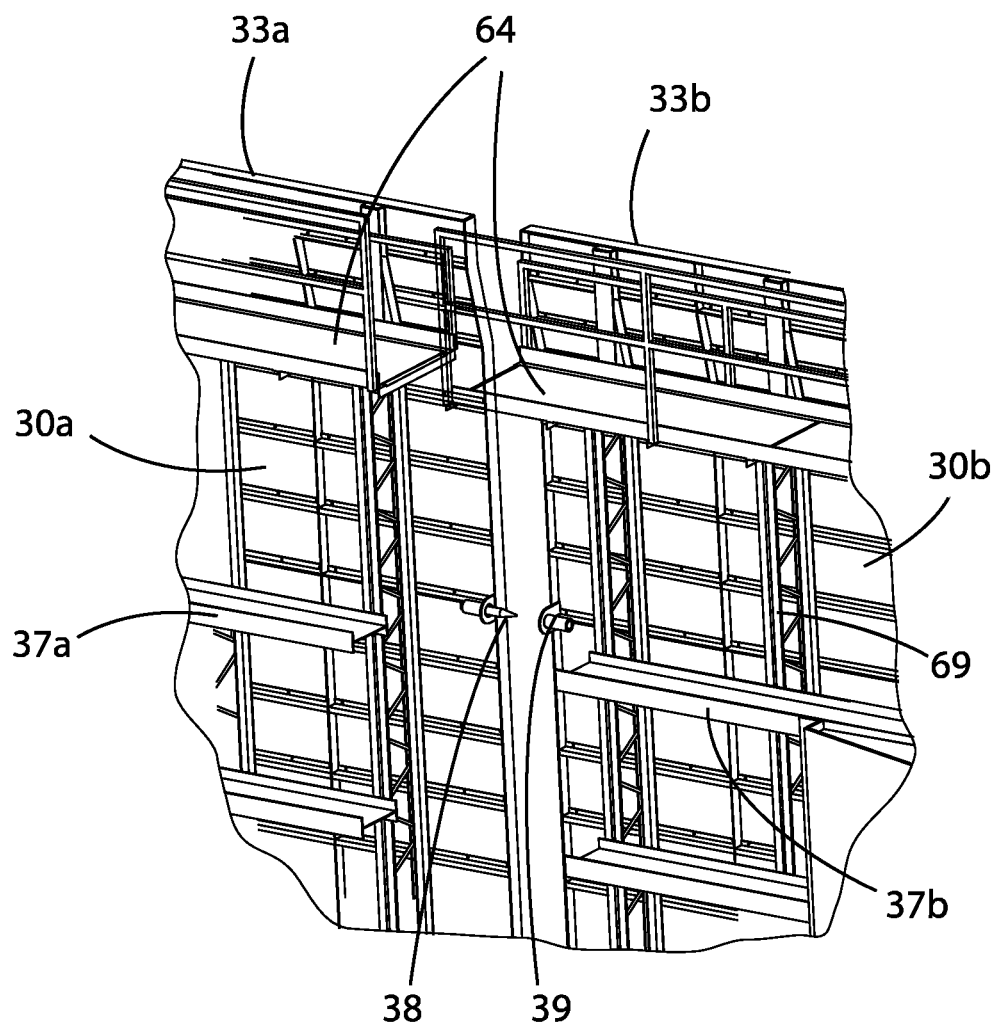
FIG. 16 is a sectional view illustrating interconnection of two adjacent first panels in accordance with an example embodiment of a concrete forming system.
Figure 17:
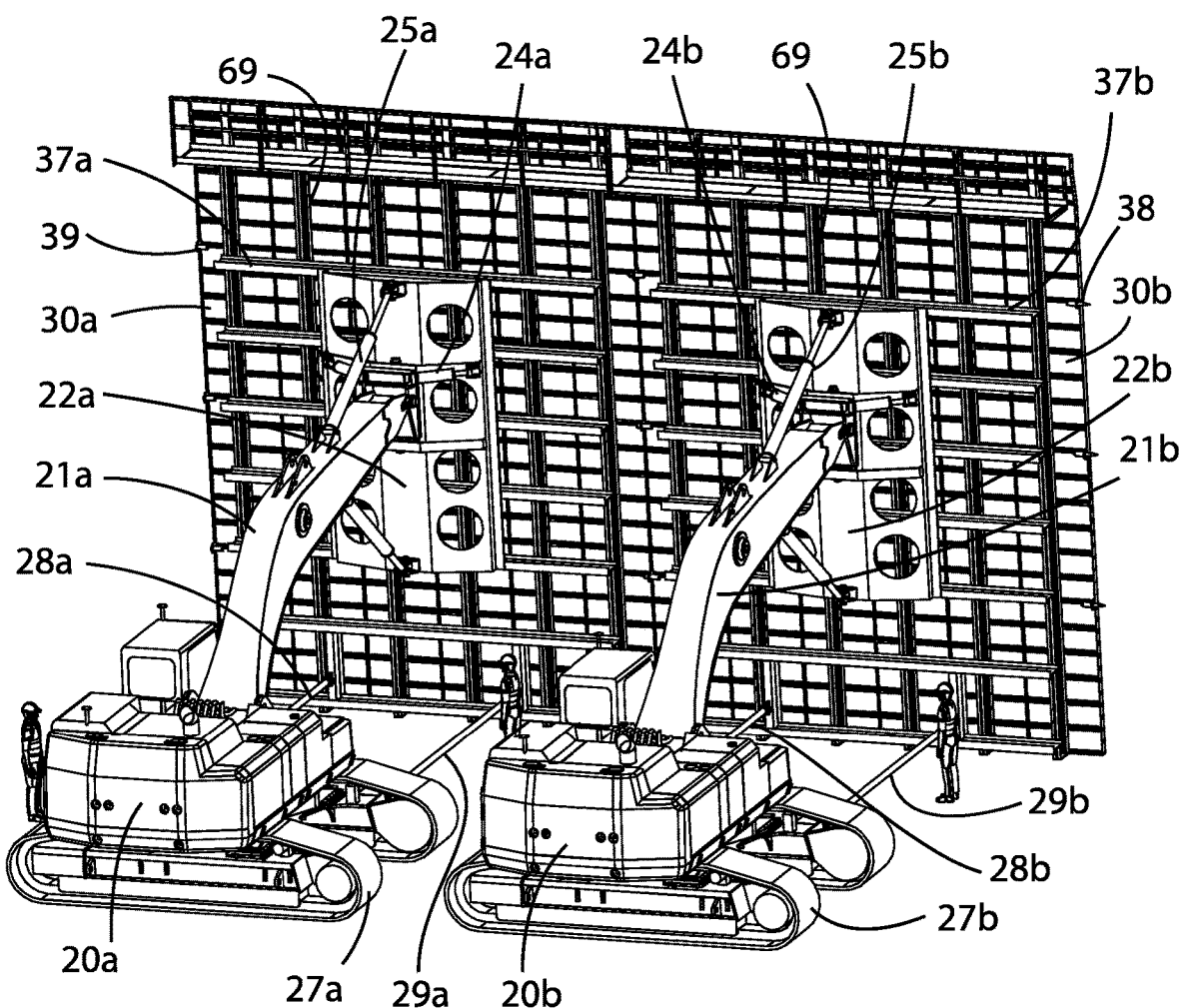
FIG. 17 is an upper perspective view of a pair of interconnected first panels being supported by a pair of vehicles in accordance with an example embodiment of a concrete forming system.
Figure 18:
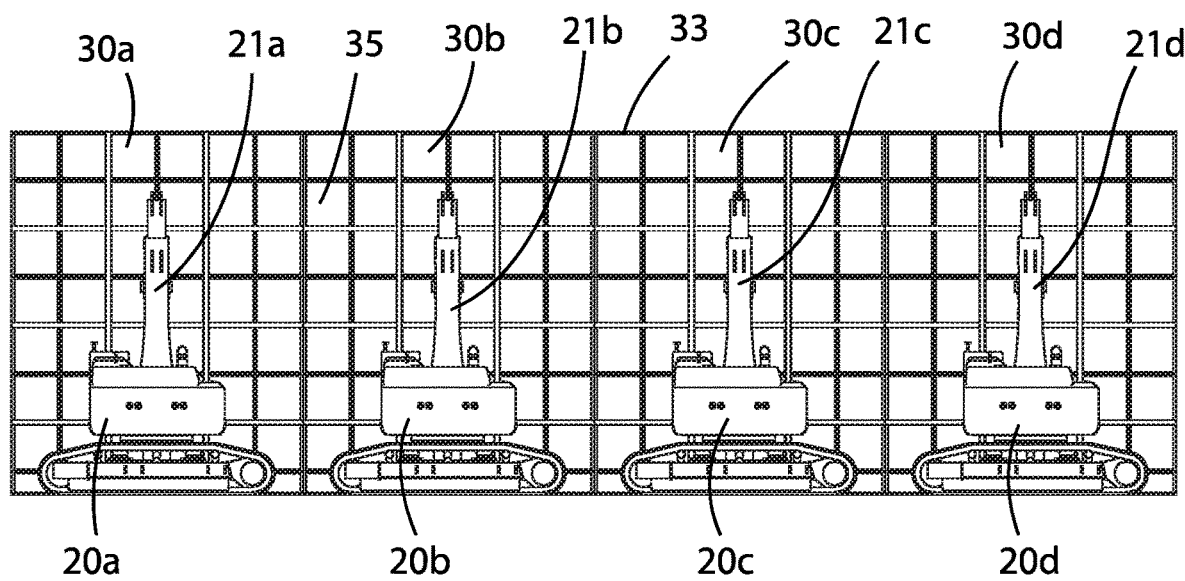
FIG. 18 is a frontal view of four walls being supported by vehicles in accordance with an example embodiment of a concrete forming system.

Each connector 38, 48 is adapted to removably engage with a corresponding receiver 39, 49 on an adjacent wall such as shown in FIGS. 16-17. The connectors 38, 48 may each comprise pins while the receivers 39, 49 may each comprise openings into which the connectors 38, 48 are inserted to interconnect adjacent walls 30, 40.

Figure 19:
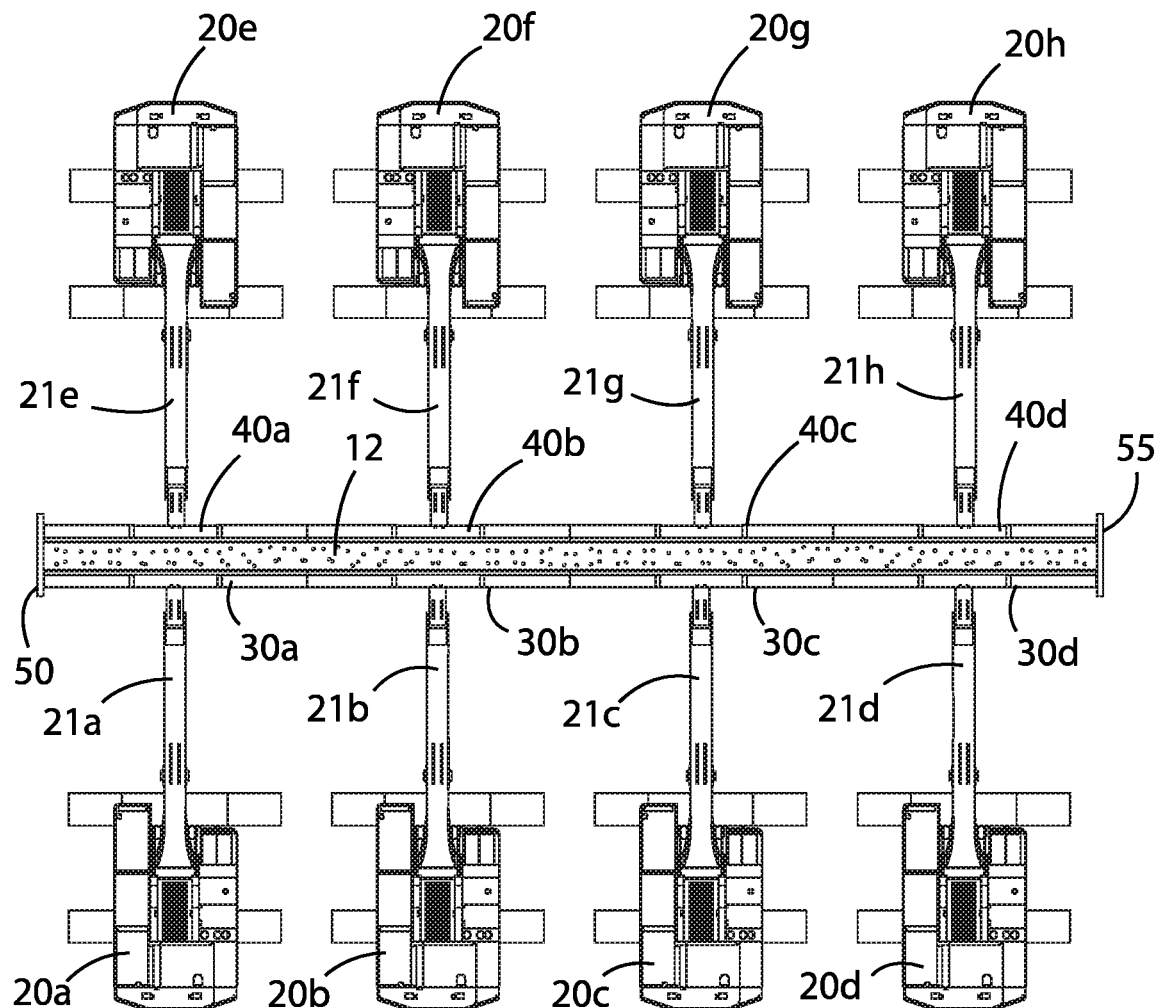
FIG. 19 is a top view of four vehicles supporting four sets of walls in accordance with an example embodiment of a concrete forming system.

FIG. 19 illustrates four first walls 30a, 30b, 30c, 30d which are interconnected to each other to form a unitary structure. Opposing the four first walls 30a, 30b, 30c, 30d are four second walls 40a, 40b, 40c, 40d which are similarly interconnected to each other to form a unitary structure. Thus, the cavity 62 extends between all of the interconnected walls 30a, 30b, 30c, 30d, 40a, 40b, 40c, 40d. As is readily apparent, this allows the length of the cavity 62 to be increased. In the embodiment shown in FIG. 19, a first sidewall 50 has been connected between the first set of walls (first wall 30a and second wall 40a). A second sidewall 55 has been connected between the fourth set of walls (first wall 30d and second wall 40d).

As shown throughout the figures, the walls 30, 40 may include or define an opening 60 through which the concrete 12 is poured into the cavity 62. In the exemplary embodiment shown in FIG. 3, the opening 60 is defined by the upper ends 33, 43, 51, 56 of the first wall 30, second wall 40, first sidewall 50, and second sidewall 50. The opening 60 could be in other locations, such as lower on the wall 30, 40 such that a hose, conduit, or other type of feeder may be connected to feed the liquid concrete 12 into the cavity 62.

As shown in FIG. 26, rebar 66 may be positioned between the walls 30, 40 in the cavity 62 prior to pouring the liquid concrete 12. Rebar 66 may be lowered into the cavity 62 through the opening 60 in some embodiments. In other embodiments, the rebar 66 may be placed against the first wall 30 before the second wall 40 is moved into place opposing the first wall 30, such as shown in FIG. 21.

D. Operation of Preferred Embodiment

Figure 27:
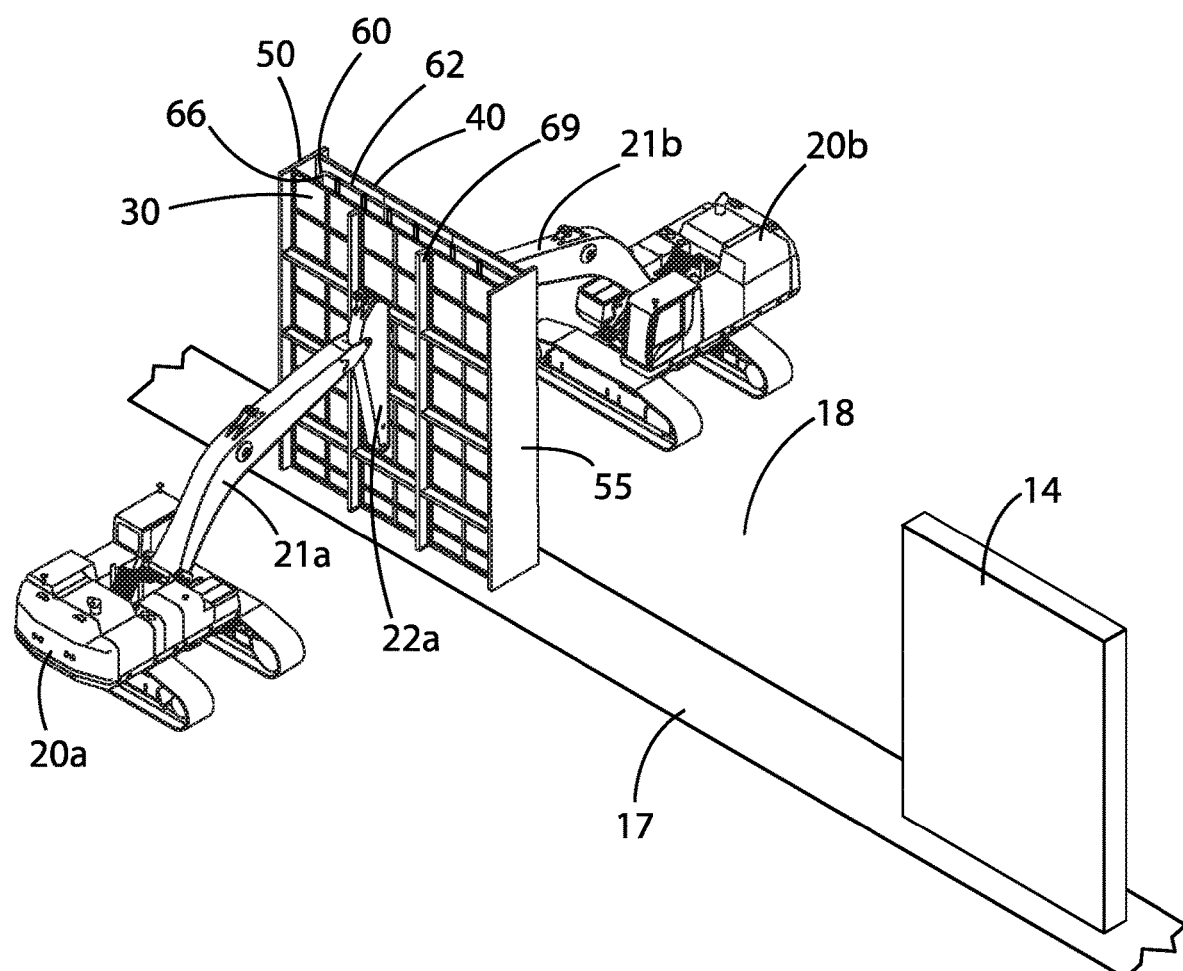
FIG. 27 is an upper perspective view of two vehicles supporting a set of walls which are separated by a gap from an existing end structure in accordance with an example embodiment of a concrete forming system.

In use, the vehicles 20 significantly decrease the time and effort required for formation of a structure 16 such as a wall. FIG. 27 illustrates a concrete form comprised of a first wall 30, a second wall 40, a first sidewall 50, and a second sidewall 55 being utilized to build a second structure segment 15 next to a first structure segment 14; with a gap 18 therebetween which may be filled in to complete the structure 16. As discussed herein, it may be beneficial to stagger structure segments 14, 15 to more efficiently build the structure with the vehicles 20 and walls 30, 40, 50, 55 available.

As shown in FIG. 27, a pair of vehicles 20a, 20b is being utilized to support a concrete form in an upright position. The first wall 30 is connected to and supported by a first vehicle 20a. The second wall 40 is connected to and supported by a second vehicle 20b. The first wall 30 may be adjusted by the first arm 21a and the second wall 40 may be adjusted by the second arm 21b.

The arm 21a of the first vehicle 20a is interconnected with the first wall 30 via the arm coupler 22a engaging with the first coupler 37 of the first wall 30. The arm 21b of the second vehicle 20b is interconnected with the second wall 40 via the arm coupler 22b engaging with the second coupler 47 of the second wall 40. Adjustment of the arms 21a, 21b may be utilized to reorient or reposition the walls 30, 40. Additionally, movement of the vehicles 20a, 20b themselves may also be utilized to reposition the walls 30, 40.

In the view shown in FIG. 27, the arms 21 of the vehicles 20a, 20b have been adjusted to orient the first and second walls 30, 40 in an upright, vertical position on a foundation 11 formed in a ground surface 17. The vehicles 20a, 20b have been positioned a distance away from a first structure segment 14; with a gap 18 between the first structure segment 14 and the location of the walls 30, 40. This type of staggering of walls may aid in efficiency and positioning of vehicles 20a, 20b.

While the figures may illustrate a foundation 11 being formed in the ground surface 17 before the forming process, it should be appreciated that a foundation 11 may be omitted in some embodiments. Once the walls 30, 40, 50, 55 are in position, rebar 66 may be lowered into the cavity 62 defined between the first wall 30, second wall 40, first sidewall 50, and second sidewall 55. In some embodiments, rebar 66 may be omitted.

Figure 29:
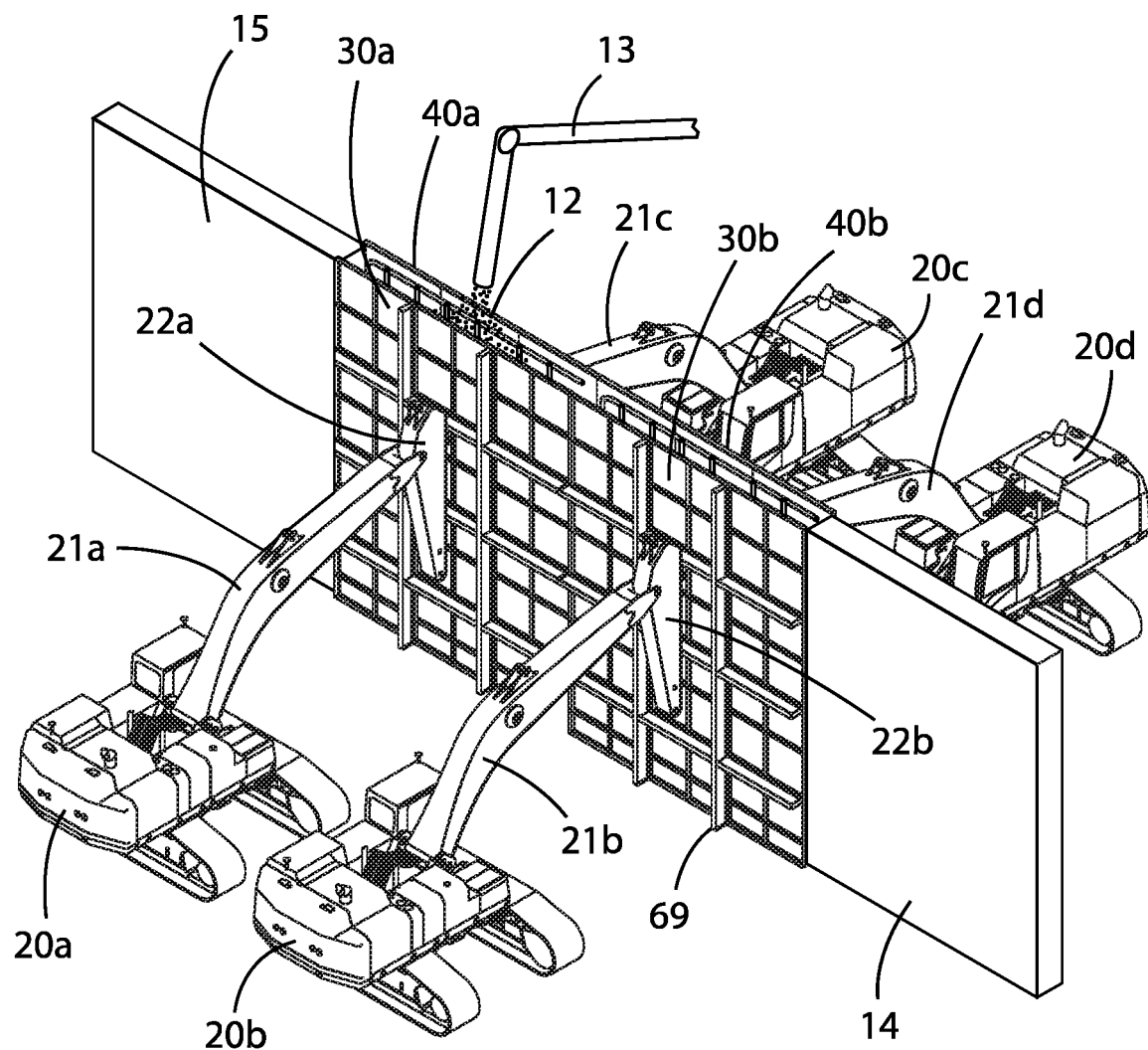
FIG. 29 is an upper perspective view of two sets of walls being used to complete the structure between the end structures in accordance with an example embodiment of a concrete forming system.

As shown in FIG. 29, with the rebar 66 in place, liquid concrete 12 is poured into the cavity 62 via the opening 60 at the upper ends 31, 41, 51, 56 of the walls 30, 40, 50, 55. The liquid concrete 12 fills the cavity 62; starting with the lower ends 34, 44, 52, 57 of the walls 30, 40, 50, 55. As the concrete 12 fills the cavity 62, the walls 30, 40, 50, 55 are retained in place by the vehicles 20a, 20b.

The cavity 62 may in some embodiments not be completely filled with concrete 12. In some embodiments, the cavity 62 will be completed filled with concrete 12. In either case, once the desired volume of liquid concrete 12 is poured or otherwise introduced into the cavity 62, such as by a concrete dispenser 13 such as a boom or the like, the walls 30, 40, 50, 55 are retained in place as the liquid concrete 12 cures and solidifies.

Figure 30:
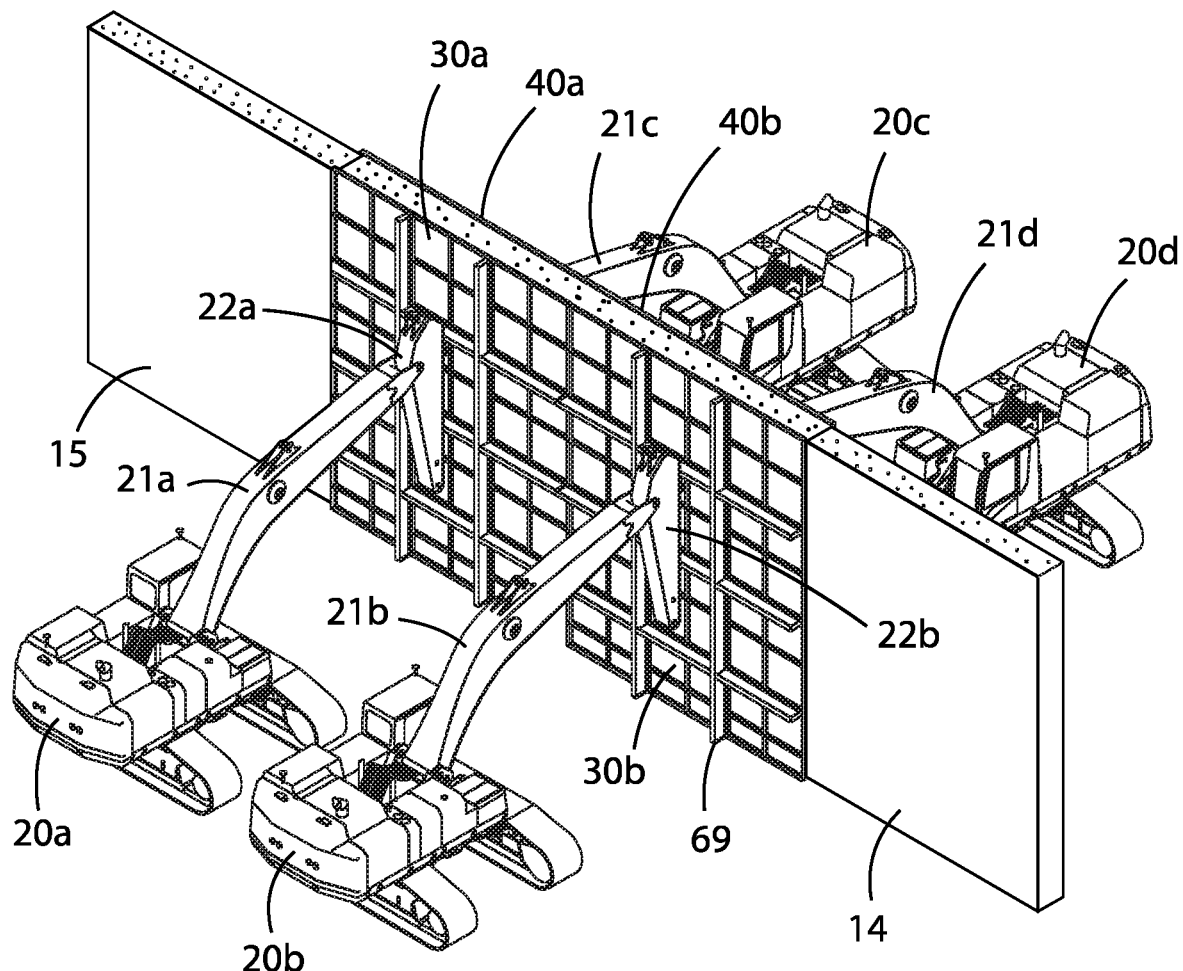
FIG. 30 is an upper perspective view of two sets of walls being used to cure concrete to complete the structure between the end structures in accordance with an example embodiment of a concrete forming system.

After the concrete 12 has cured into a solid mass such as shown in FIG. 30, the walls 30, 40, 50, 55 may be removed from around the resulting structure 16. The walls 30, 40, 50, 55 may be removed in any number of manners. In one embodiment, the first sidewall 50 is disconnected from the first ends 31, 41 of the first and second walls 30, 40. The second sidewall 55 is disconnected from the second ends 32, 42 of the first and second walls 30, 40. The first vehicle 20a may then move to another location with the first wall 30 while the second vehicle 20b moves to another location with the second wall 40. When at the other location, the vehicles 20a, 20b may be put into place, the sidewalls 50, 55 reattached, and the process repeated. In another embodiment, the arms 21a, 21b of the vehicles 20a, 20b may be lifted together to pull the walls 30, 40, 50, 55 off of the structure 16.

FIG. 26 illustrates the use of four sets of first and second walls 30, 40 to create an elongated cavity 62 which extends through all sets of walls 30, 40. In the embodiment shown in FIG. 26, each set of walls comprises a first wall 30a, 30b, 30c, 30d and an opposing second wall 40a, 40b, 40c, 40d. A first vehicle 20a retains a first wall 30d and a second vehicle 20h retains the second wall 40a. A third vehicle 20b retains the first wall 30c and a fourth vehicle 20g retains the second wall 40b. A fifth vehicle 20c retains the first wall 30b and a sixth vehicle 20f retains the second wall 40c. A seventh vehicle 20d retains the first wall 30a and an eighth vehicle 20e the second wall 40d. Arms 21a, 21b, 21c, 21d, 21e, 21f, 21g, 21h are interconnected to the walls 30a, 30b, 30c, 30d, 40a, 40b, 40c, 40d via arm couplers 22a, 22b, 22c, 22d, 22e, 22f, 22g, 22h.

The manner or order in which the walls 30a, 30b, 30c, 30d, 40a, 40b, 40c, 40d are put into place may vary. In some embodiments, each set of walls 30a, 30b, 30c, 30d, 40a, 40b, 40c, 40d is put into place in turn; with the first set of walls 30a, 40d being put into place by the vehicles 20d, 20e. The second set of walls 30b, 40c are then put into place by the vehicles 20c, 20f; with the first wall 30b being connected to the first wall 30a and the second wall 40d being connected to the second wall 40c. The third set of walls 30c, 40b are then put into place by the vehicles 20b, 20g; with the first wall 30c being connected to the first wall 30b and the second wall 40b being connected to the second wall 40c. The fourth set of walls 30d, 40a are then put into place by the vehicles 20d, 20h; with the first wall 30d being connected to the first wall 30c and the second wall 40a being connected to the second wall 40b.

In the embodiment shown in FIG. 19, a first sidewall 50 has been connected to the first ends 31, 41 of the first and second walls 30a, 40a. A second sidewall 55 has been connected to the second ends 32, 42 of the first and second walls 30d, 40d. Thus, the cavity 62 extends from the first set of walls to the fourth set of walls; with the sidewalls 50, 55 enclosing the cavity 62. Liquid concrete 12 may then be poured through the opening 60 of the cavity 62 to fill the cavity 62. The concrete 12 allowed to solidify and cure, after which the walls 30a, 30b, 30c, 30d, 40a, 40b, 40c, 40d may be removed and then repositioned to repeat the process again. FIG. 26 illustrates the same configuration, but without the sidewalls 50, 55 and with rebar 66 positioned in the cavity 62. Such a configuration may be utilized to cast a set of walls between two existing structure segments 14, 15.

FIGS. 32-38 illustrate multiple sets of vehicles 20 being utilized to complete different structure segments 14, 15 in a staggered configuration to complete a structure 16. As shown, sets of vehicles 20 and walls 30, 40 are utilized to form discrete structure segments 14, 15 which are separated by gaps 18. The same vehicles 20 may then be utilized to fill the gaps 18 to complete the structure 16 while additional vehicles 20 are utilized to create additional structure segments 14, 15 separated by gaps 18 that themselves will be filled in a staggered fashion.

Such a staggered method of completed the structure 16 allows multiple crews to work simultaneously. While one set of vehicles 20 is at a first location while concrete 12 is cured to form a first structure segment 14, additional sets of vehicles 20 may be in transit or in another location to form a second structure segment 15. The gaps 18 ensure that vehicles 20 do not get in each other's way. Additionally, gaps 18 may be utilized to account for elevation changes; with the first and second structure segments 14, 15 straddling an elevation change.

FIGS. 27-31 illustrate such a method of forming a structure 16. As shown in FIG. 27, a first structure segment 14 has already been constructed. A pair of vehicles 20a, 20b are supporting walls 30, 40 having an opening 60 fluidly connected to a cavity 62. It can be seen that rebar 66 has been positioned in the cavity 62. Liquid concrete 12 may be poured into the cavity 62 via the opening 60; with the concrete 12 filling the cavity 62 around the rebar 66. The concrete 12 may be allowed to cure, and the walls 30, 40, 50, 55 removed by the vehicles 20a, 20b.

Figure 28:
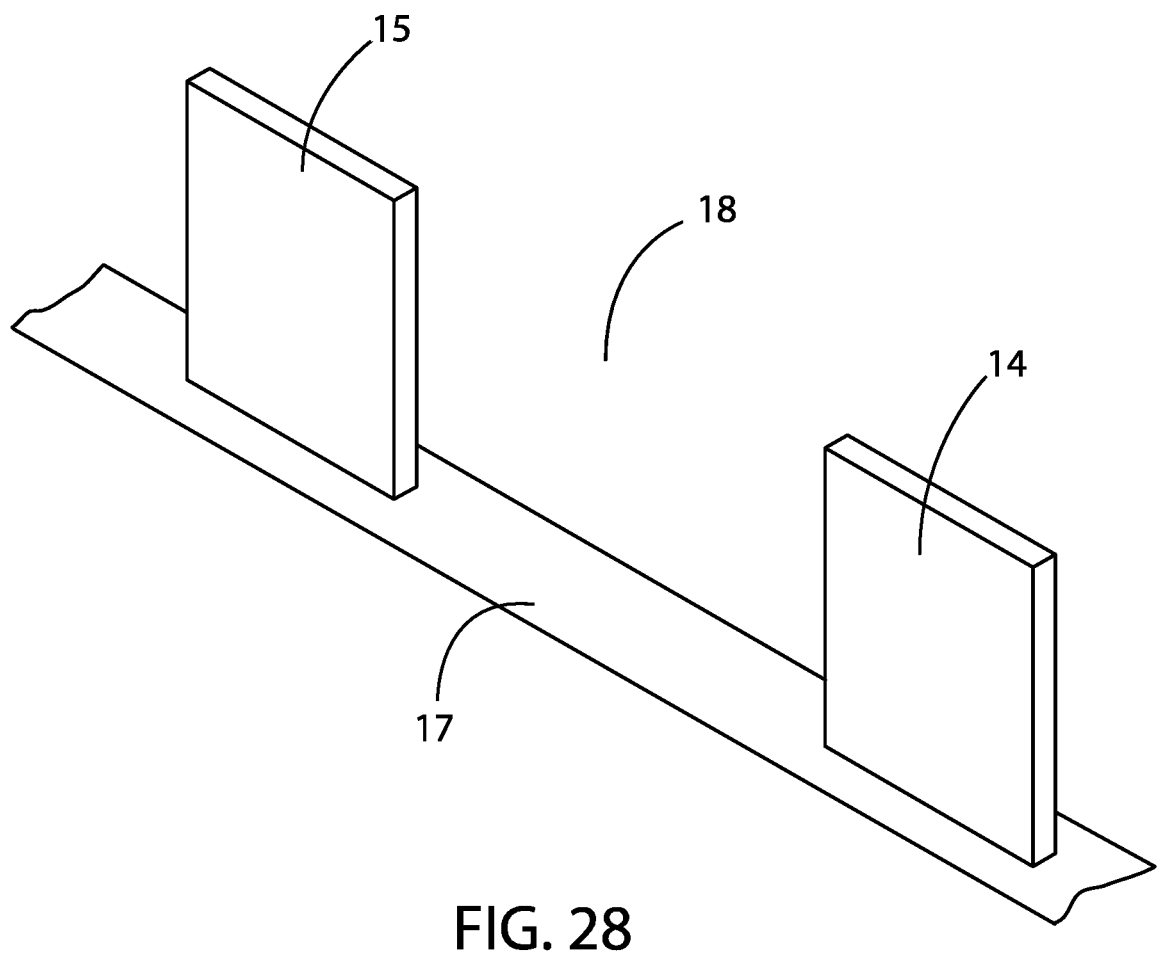
FIG. 28 is an upper perspective view of two end structures with a gap in between them in accordance with an example embodiment of a concrete forming system.

FIG. 28 illustrates the first structure segment 14 and the second structure segment 15 having been constructed with a gap 18 between the segments 14, 15. As shown in FIG. 29, two sets of walls 30a, 30b, 40a, 40b have been positioned in the gap 18 and are being retained by four vehicles 20a, 20b, 20c, 20d. A first vehicle 20a supports the first wall 30a, a second vehicle 20b supports the second wall 40a, a third vehicle 20c supports the first wall 30b, and a fourth vehicle 20d supports the second wall 40b.

Continuing to reference FIG. 29, the first wall 30a is connected to the first wall 30b; with both first walls 30a, 30b being positioned between the structure segments 14, 15 in the gap 18. The second wall 40a is connected to the second wall 40b; with both second walls 40a, 40b being positioned between the structure segments 14, 15 in the gap 18. The first wall 30a is spaced-apart and opposite the second wall 40a. The first wall 30b is spaced-apart and opposite the second wall 40b. The first wall 30a is not connected to the second wall 40a. The first wall 30b is not connected to the second wall 40b. Such a configuration is possible without the use of ties or other connections between opposing walls 30a, 30b, 40a, 40b because the vehicles 20a, 20b, 20c, 20d retain the walls 30a, 30b, 40a, 40b in place.

Figure 31:
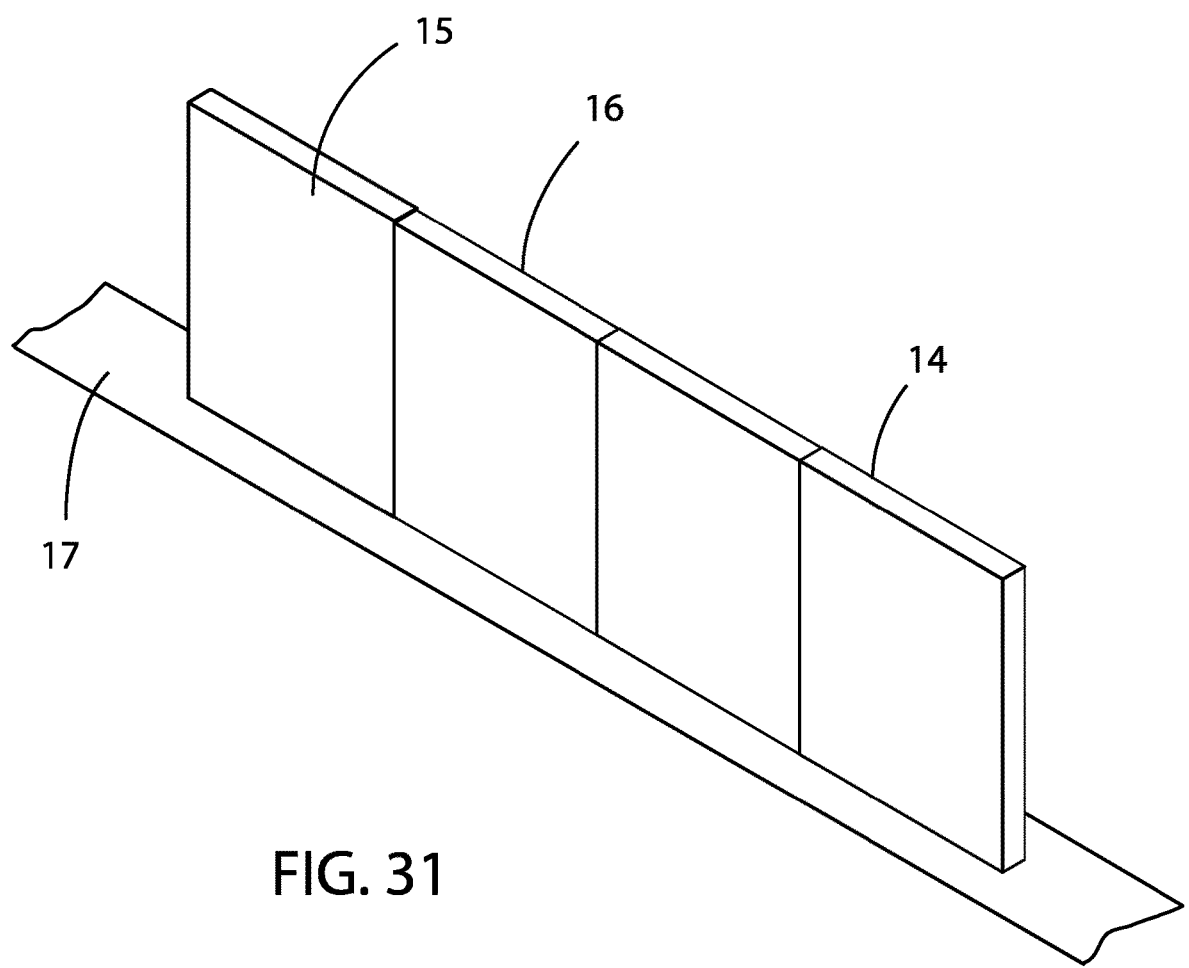
FIG. 31 is an upper perspective view of the completed structure in accordance with an example embodiment of a concrete forming system.

As can be seen in FIG. 29, the cavity 62 extends across both sets of walls 30a, 30b, 40a, 40b. Liquid concrete 12 is poured through the opening 60 into the cavity 62, such as by a concrete dispenser 13 such as a boom. The concrete 12 fills the cavity 62 and surrounds the rebar 66 as shown in FIG. 30. The liquid concrete 12 is allowed to solidify form the structure 16 as shown in FIG. 30. The vehicles 20a, 20b, 20c, 20d are then removed. FIG. 31 illustrates the completed structure 16.

FIGS. 32-38 illustrate a method by which multiple crews 70, 72, 74, 76 may work efficiently together to complete an elongated structure 16 such as a concrete wall. Each crew 70, 72, 74, 76 includes four vehicles 20 comprised of excavators. The first crew 70 has four arms 21 each supporting a first wall 30. The second crew 72 has four arms 21 each supporting a second wall 40; with the first walls 30 and the second walls 40 of the first crew 70 and the second crew 72 forming a first set of walls.

The third crew 74 similarly has four arms 21 each supporting a first wall 30. The fourth crew 76 has four arms 21 each supporting a second wall 40; with the first walls 30 and the second walls 40 of the third crew 74 and the fourth crew 76 forming a second set of walls adapted to form a second cavity 62 for receiving liquid concrete 12 to be cured.

Figure 32:
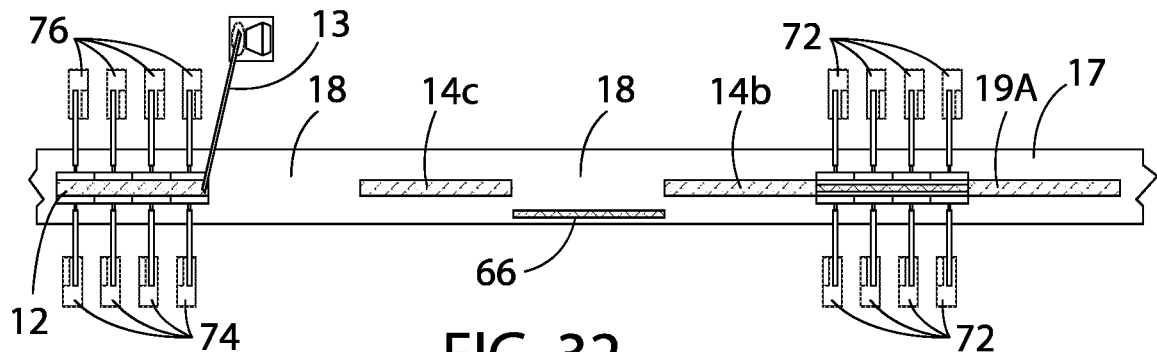
FIG. 32 is a first top view illustrating four crews being utilized to build a structure in a staggered fashion in accordance with an example embodiment of a concrete forming system.

As shown in FIG. 32, three completed segments 19a, 19b, 19c have been previously completed by the crews 70, 72, 74, 76, with gaps 18 between each of the segments 19a, 19b, 19c. The first and second crews 70, 72 in FIG. 32 are in position between the first completed segment 19a and the second completed segment 19b curing poured concrete 12 to form a fourth completed segment 19d. The third and fourth crews 74, 76 in FIG. 32 are in position forming a fifth completed segment 19e, with concrete 12 being poured from a concrete dispenser 13. A gap 18 is present between the third completed segment 19c and the fourth completed segment 19d that is being formed by the third and fourth crews 74, 76.

Figure 33:
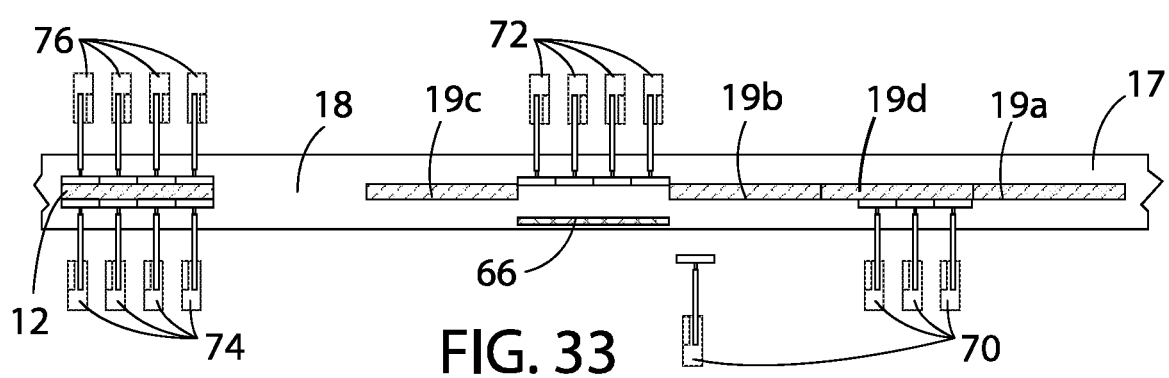
FIG. 33 is a second top view illustrating four crews being utilized to build a structure in a staggered fashion in accordance with an example embodiment of a concrete forming system.
Figure 34:
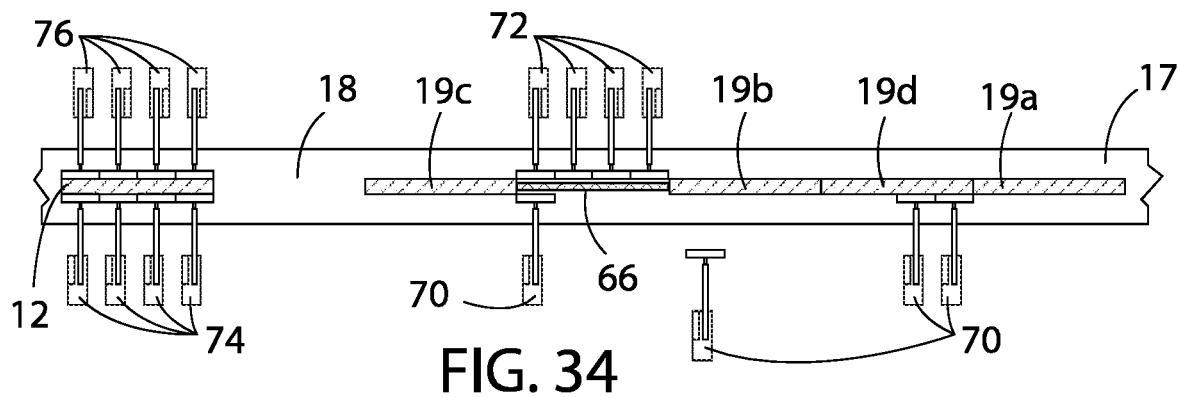
FIG. 34 is a third top view illustrating four crews being utilized to build a structure in a staggered fashion in accordance with an example embodiment of a concrete forming system.
Figure 35:
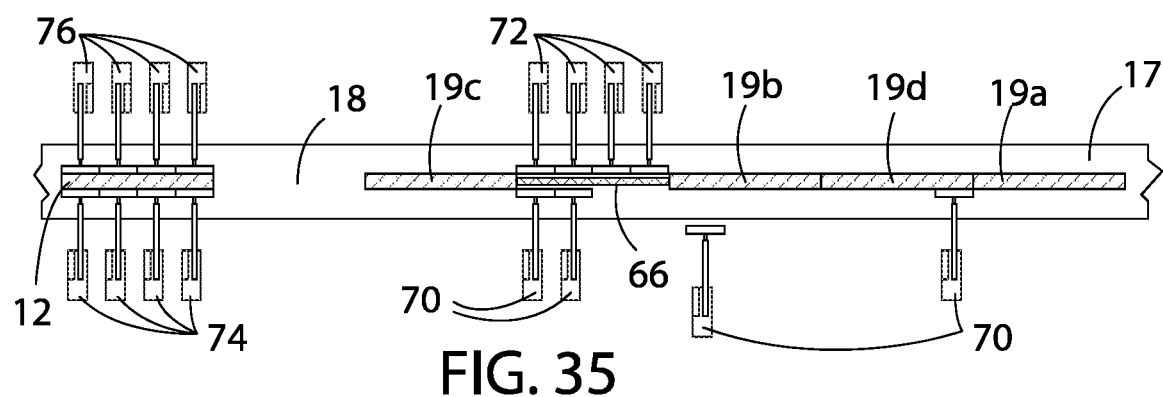
FIG. 35 is a fourth top view illustrating four crews being utilized to build a structure in a staggered fashion in accordance with an example embodiment of a concrete forming system.

In FIG. 33, it can be seen that the first and second crews 70, 72 have completed the fourth completed segment 19d. The second crew 72 has moved to the gap 18 between the second completed segment 19b and the third completed segment 19c. Rebar 66 is in place to be positioned next to the walls 30 of the second crew 72. In FIGS. 33-36, it is shown how, after the rebar 66 is set, each vehicle 20 of the first crew 70 moves over to oppose the second crew 72.

Figure 36:
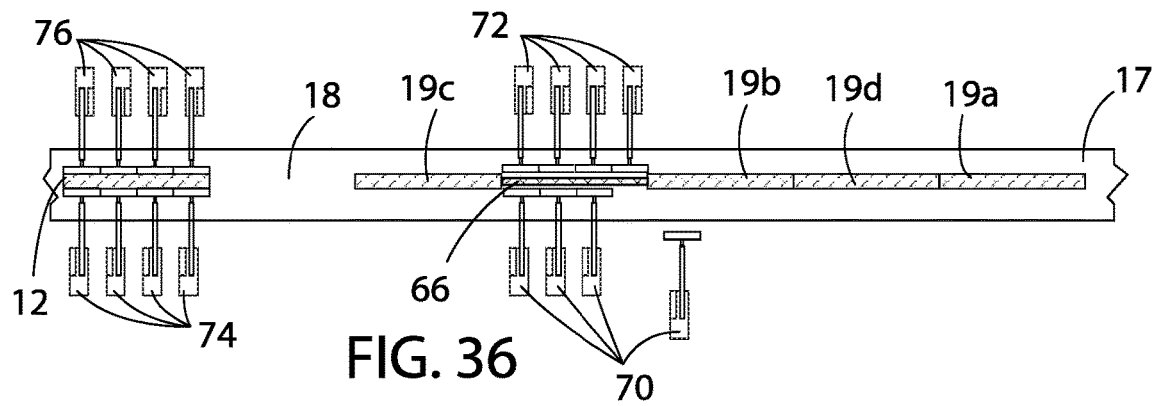
FIG. 36 is a fifth top view illustrating four crews being utilized to build a structure in a staggered fashion in accordance with an example embodiment of a concrete forming system.
Figure 37:
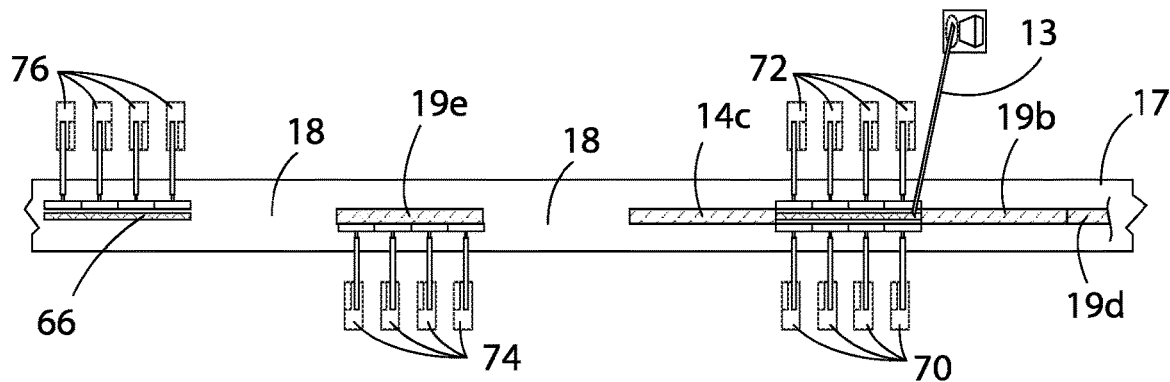
FIG. 37 is a sixth top view illustrating four crews being utilized to build a structure in a staggered fashion in accordance with an example embodiment of a concrete forming system.
Figure 38:
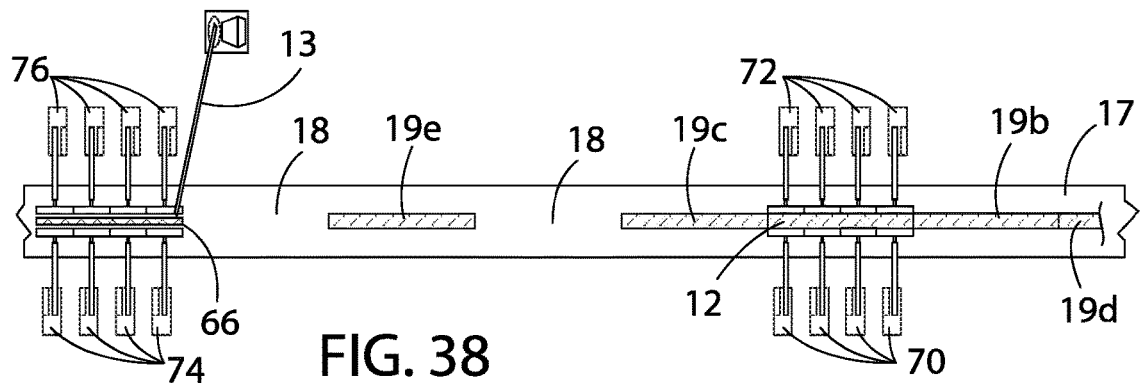
FIG. 38 is a seventh top view illustrating four crews being utilized to build a structure in a staggered fashion in accordance with an example embodiment of a concrete forming system.

As the second crew 72 is in motion, the fifth completed segment 19e has been curing such as shown in FIG. 36. FIG. 37 illustrates that the fifth completed segment 19e has been finished. Both the first and second crews 70, 72 are in position and receiving concrete 12 to cure from a concrete dispenser 13. The fourth crew 76 is positioned a distance away from fifth completed segment 19e such that a gap 18 is present between the fifth completed segment 19e and the location of the fourth crew 76. Rebar 66 has been put in place. In FIG. 38, it can see that the concrete 12 between the first and second crews 70, 72 has set. These crews 70, 72 are now ready to move to the next gap 18. Concrete 12 is being poured between the third and fourth crews 74, 76. That concrete 12 will set while the first and second crews 70, 72 are in motion to the next gap 18.

As seen in the above figures and description, utilizing multiple crews 70, 72, 74, 76 which stagger completed segments 19 with gaps 18 may significantly improve efficiency. The crews 70, 72, 74, 76 are able to avoid each other due to the use of the gaps 18; which will prevent two sets of crews 70, 72, 74, 76 from ever being in close proximity to each other, which can be difficult due to the size of the vehicles 20. Additionally, if obstructions or changes in elevation are present, gaps 18 can be used to complete work on other locations along the path of the structure 16.

Unless otherwise defined, all technical and scientific terms used herein have the same meaning as commonly understood by one of ordinary skill in the art to which this invention belongs. Although methods and materials similar to or equivalent to those described herein can be used in the practice or testing of the concrete forming system, suitable methods and materials are described above. All publications, patent applications, patents, and other references mentioned herein are incorporated by reference in their entirety to the extent allowed by applicable law and regulations. The concrete forming system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A concrete forming system, comprising:
a first wall having a first end, a second end, an upper end and a lower end;
a second wall having a first end, a second end, an upper end and a lower end;
a cavity defined between the first wall and the second wall, wherein the cavity is adapted to receive a volume of concrete;
an opening formed within the upper ends of the first wall and second wall, wherein the opening is fluidly connected with the cavity, wherein the opening is adapted to receive the concrete; and
a first vehicle adapted to traverse a ground surface, wherein the first vehicle includes:
a first arm extending from the first vehicle, wherein the first arm retains the first wall in a desired position with respect to the second wall;
a first arm coupler connected between the first arm and the first wall;
a plurality of first wheels or a plurality of first tracks connected to a first motor; and
a first actuator connected between the first arm and the first arm coupler, wherein the first actuator is adapted to adjust the first wall with respect to the first arm.

2. The concrete forming system of claim 1, wherein the first actuator is adapted to adjust the attitude of the first wall with respect to the first arm.

3. The concrete forming system of claim 2, wherein the first actuator is adapted to adjust the pitch of the first wall with respect to the first arm.

4. The concrete forming system of claim 3, including a second actuator connected between the first arm and the first arm coupler, wherein the second actuator is adapted to adjust a yaw of the first wall with respect to the first arm.

5. The concrete forming system of claim 4, including a third actuator connected to the first arm coupler, wherein the third actuator is adapted to adjust a roll of the first wall with respect to the first arm.

6. The concrete forming system of claim 1, including a support movably connected to the first vehicle, wherein the support is removably connected to the first wall.

7. The concrete forming system of claim 1, including a second vehicle adapted to traverse the ground surface, wherein the second vehicle includes:
a second arm extending from the second vehicle, wherein the second arm retains the second wall in a desired position with respect to the first wall;
a second arm coupler connected between the second arm and the second wall; and
a plurality of second wheels or a plurality of second tracks connected to a second motor; and
a second actuator connected between the second arm and the second arm coupler, wherein the second actuator is adapted to adjust the second wall with respect to the second arm.

8. The concrete forming system of claim 1, wherein the first wall includes a first coupler connected to the first arm coupler.

9. The concrete forming system of claim 1, including a first sidewall connected between the first ends of the first wall and the second wall.

10. The concrete forming system of claim 9, including a second sidewall connected between the second ends of the first wall and the second wall.

11. A method of using the concrete forming system of claim 1, comprising the steps of:
moving the first wall with the first vehicle from a previous location to a first location, wherein the first location is distally spaced with respect to the previous location;
positioning the first wall with the first vehicle such that a lower end of the first wall is retained in the first location;
moving the second wall with a second vehicle from the previous location to a second location, wherein the second location is distally spaced with respect to the previous location and the first location;
positioning the second wall with the second vehicle such that a lower end of the second wall is retained in the second location, distally spaced with respect to the second wall;
filling the cavity between the first wall and the second wall with the volume of concrete; and
curing the volume of concrete within the cavity between the first wall and the second wall.

12. A concrete forming system, comprising:
a first wall having a first end, a second end, an upper end, and a lower end;
a second wall having a first end, a second end, an upper end, and a lower end;
wherein the first wall is positioned in an opposed spaced-apart relationship with respect to the second wall;
a first cavity defined between the first wall and the second wall, wherein the first cavity is adapted to receive a volume of concrete;
a first vehicle adapted to traverse a ground surface, wherein the first vehicle includes:
a first arm extending from the first vehicle, wherein the first arm retains the first wall in a desired position with respect to the second wall;
a first arm coupler connected between the first arm and the first wall; and
a plurality of first wheels or a plurality of first tracks connected to a first motor; and
a second vehicle adapted to traverse the ground surface, wherein the second vehicle includes:
a second arm extending from the second vehicle, wherein the second arm retains the second wall in a desired position with respect to the first wall;
a second arm coupler connected between the second arm and the second wall; and a plurality of second wheels or a plurality of second tracks connected to a second motor.

13. The concrete forming system of claim 12, including a first sidewall connected between the first ends of the first wall and the second wall.

14. The concrete forming system of claim 13, including a second sidewall connected between the second ends of the first wall and the second wall.

15. The concrete forming system of claim 12, comprising:
a third wall having a first end, a second end, an upper end, and a lower end;
a fourth wall having a first end, a second end, an upper end, and a lower end;
wherein the third wall is positioned in an opposed spaced-apart relationship with respect to the fourth wall;
a second cavity defined between the third wall and the fourth wall, wherein the second cavity;
a third vehicle adapted to traverse a ground surface, wherein the third vehicle includes:
a third arm extending from the third vehicle, wherein the third arm retains the third wall in a desired position with respect to the fourth wall;
a third arm coupler connected between the third arm and the third wall; and
a plurality of third wheels or a plurality of third tracks connected to a third motor; and
a fourth vehicle adapted to traverse the ground surface, wherein the fourth vehicle includes:
a fourth arm extending from the fourth vehicle, wherein the fourth arm retains the fourth wall in a desired position with respect to the third wall;
a fourth arm coupler connected between the fourth arm and the fourth wall; and
a plurality of fourth wheels or a plurality of fourth tracks connected to a fourth motor.

16. The concrete forming system of claim 15, wherein the first wall is removably connected to the third wall.

17. The concrete forming system of claim 16, wherein the second wall is removably connected to the fourth wall.

18. The concrete forming system of claim 15, wherein the first cavity is fluidly connected to the second cavity.

19. The concrete forming system of claim 15, wherein the first wall is not connected to the third wall and wherein the second wall is not connected to the fourth wall.

20. A method of using the concrete forming system of claim 12, comprising the steps of:
moving the first wall with the first vehicle from a previous location to a first location, wherein the first location is distally spaced with respect to the previous location;
positioning the first wall with the first vehicle such that a lower end of the first wall is retained in the first location;
moving the second wall with the second vehicle from the previous location to a second location, wherein the second location is distally spaced with respect to the previous location and the first location;
positioning the second wall with the second vehicle such that a lower end of the second wall is retained in the second location, distally spaced with respect to the second wall;
filling the cavity between the first wall and the second wall with the volume of concrete; and
curing the volume of concrete within the cavity between the first wall and the second wall.

21. A method of forming a concrete structure, comprising the steps of:
moving a first wall with a first vehicle from a previous location to a first location, wherein the first location is distally spaced with respect to the previous location;
positioning the first wall with the first vehicle such that a lower end of the first wall is retained in the first location;
moving a second wall with a second vehicle from the previous location to a second location, wherein the second location is distally spaced with respect to the previous location and the first location;
positioning the second wall with the second vehicle such that a lower end of the second wall is retained in the second location, distally spaced with respect to the second wall so as to define a cavity between the first wall and the second wall;
filling the cavity between the first wall and the second wall with a volume of concrete; and
curing the volume of concrete within the cavity between the first wall and the second wall.

22. The method of claim 21, wherein the step of positioning the second wall includes positioning the second wall parallel to the first wall.

23. A concrete forming system, comprising:
a first wall having a first end, a second end, an upper end and a lower end;
a second wall having a first end, a second end, an upper end and a lower end;
a cavity defined between the first wall and the second wall, wherein the cavity is adapted to receive a volume of concrete;
an opening formed within the upper ends of the first wall and second wall, wherein the opening is fluidly connected with the cavity, wherein the opening is adapted to receive the concrete;
a first vehicle adapted to traverse a ground surface, wherein the first vehicle includes:
a first arm extending from the first vehicle, wherein the first arm retains the first wall in a desired position with respect to the second wall;
a first arm coupler connected between the first arm and the first wall;
a plurality of first wheels or a plurality of first tracks connected to a first motor; and
a first actuator connected between the first arm and the first arm coupler, wherein the first actuator is adapted to adjust the first wall with respect to the first arm; and
a support connected between the first vehicle and the first wall.

24. The concrete forming system of claim 23, wherein the support is adjustable between a first position wherein the support is not connected to the first wall and a second position wherein the support is connected to the first wall.

25. The concrete forming system of claim 23, wherein the support is removably connected to the first wall.

26. The concrete forming system of claim 23, wherein the support is connected to a lower portion of the first wall.

* * * * *

UNITED STATES PATENT AND TRADEMARK OFFICE
CERTIFICATE OF CORRECTION

PATENT NO. : 10,655,347 B2
APPLICATION NO. : 15/997597
DATED : May 19, 2020
INVENTOR(S) : Thomas Fisher and Gregory Schafer Page 1 of 1

It is certified that error appears in the above-identified patent and that said Letters Patent is hereby corrected as shown below:

In the Claims

Claim 20, Column 19, Line 61, "filling the cavity between the first wall and the second" should read -- filling the first cavity between the first wall and the second --

Claim 20, Column 20, Line 1, "curing the volume of concrete within the cavity between" should read -- curing the volume of concrete within the first cavity between --

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*